(12) United States Patent
Shimoda

(10) Patent No.: US 10,133,364 B2
(45) Date of Patent: Nov. 20, 2018

(54) IMAGE PROCESSING APPARATUS AND METHOD

(71) Applicant: SONY CORPORATION, Tokyo (JP)

(72) Inventor: Ryuichi Shimoda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 44 days.

(21) Appl. No.: 15/101,972

(22) PCT Filed: Dec. 5, 2014

(86) PCT No.: PCT/JP2014/082214
§ 371 (c)(1),
(2) Date: Jun. 6, 2016

(87) PCT Pub. No.: WO2015/093315
PCT Pub. Date: Jun. 25, 2015

(65) Prior Publication Data
US 2016/0320863 A1    Nov. 3, 2016

(30) Foreign Application Priority Data

Dec. 19, 2013   (JP) .................................. 2013-262100

(51) Int. Cl.
*G09G 5/00*      (2006.01)
*G06F 3/0346*    (2013.01)
(Continued)

(52) U.S. Cl.
CPC .......... *G06F 3/0346* (2013.01); *G06F 3/0489* (2013.01); *G06T 19/006* (2013.01)

(58) Field of Classification Search
CPC .... G06F 3/0346; G06F 3/0489; G06T 19/006
(Continued)

(56) References Cited

U.S. PATENT DOCUMENTS

2007/0268316 A1* 11/2007 Kajita ..................... G06T 5/006
                                                    345/642
2013/0326364 A1* 12/2013 Latta ....................... G06F 3/012
                                                    715/751
2015/0193940 A1*  7/2015 Shoji ..................... G06T 19/006
                                                    382/173

FOREIGN PATENT DOCUMENTS

JP        2001-282428 A     10/2001
JP        2003-288156 A     10/2003
(Continued)

*Primary Examiner* — Mark Regn
(74) *Attorney, Agent, or Firm* — Chip Law Group

(57) ABSTRACT

The present technique relates to an image processing apparatus, method, and program which can improve operability. A short distance image separation unit generates a short distance image indicating a short distance object located at the side of an imaging unit, on the basis of a clipped image which is clipped from an input image captured by the imaging unit, and a distance image indicating the distance to an object in each region of the clipped image. A contour extraction unit extracts, as an adjustment image, a contour of the short distance image, and a display image generation unit generates an output image on the basis of the adjustment image and displays the output image on an image display unit. The user moves his/her hand while viewing the output image displayed on the image display unit so that his/her hand overlaps with the region of the hand in the output image. An XY calculation unit calculates the amount of correction of the display position of the image on the basis of adjustment images of different time points. The technique may be applied to a head mount display.

12 Claims, 24 Drawing Sheets

(51) Int. Cl.
  *G06F 3/0489* (2013.01)
  *G06T 19/00* (2011.01)
(58) Field of Classification Search
  USPC .......................................................... 345/156
  See application file for complete search history.

(56) References Cited

FOREIGN PATENT DOCUMENTS

| | | | |
|---|---|---|---|
| JP | 2011-198150 | A | 10/2011 |
| JP | 2011-203823 | A | 10/2011 |
| JP | 2013-041431 | A | 2/2013 |
| JP | 2013041431 | A * | 2/2013 |

* cited by examiner

IMAGE PROCESSING APPARATUS AND METHOD

CROSS REFERENCE TO RELATED APPLICATIONS

This application is a U.S. National Phase of International Patent Application No. PCT/JP2014/082214 filed on Dec. 5, 2014, which claims priority benefit of Japanese Patent Application No. JP 2013-262100 filed in the Japan Patent Office on Dec. 19, 2013. Each of the above-referenced applications is hereby incorporated herein by reference in its entirety.

TECHNICAL FIELD

The present technique relates to an image processing apparatus and method, and a program, and particularly relates to an image processing apparatus and method, and a program configured to be capable of improving operability.

BACKGROUND ART

Recently, by the advancement of a central processing unit (CPU), a graphics processing unit (GPU), and the like, virtual reality is realized utilizing a computer graphics (CG) image, and further augmented reality (AR) is also realized combining a actually photographed image and a virtual image utilizing the virtual reality.

For example, as a technique related to such augmented reality, there is proposed a technique of displaying an image superimposed on the position of an object existing in a real environment, and performing processing according to operation for the image (refer to Patent Literature 1, for example).

In addition, there is also proposed an image display apparatus for realizing augmented reality, such as a see-through head mount display, which allows a user to directly see the actual space with the naked eye through semi-transparent glasses, and realizes augmented reality by displaying an image on the glasses.

CITATION LIST

Patent Literature

Patent Literature 1: JP 2011-203823A

SUMMARY OF INVENTION

Technical Problem

The aforementioned technique however has failed to improve the operability of see-through image display apparatuses.

Since in a typical see-through image display apparatus, for example, user operation is performed using a touch interface or button interface, it is difficult for the user to operate with his/her head being covered by the screen, and thus the operability is not so excellent.

The present technique is achieved in view of such a situation, and aims to improve the operability.

Solution to Problem

According to an aspect of the present technique, there is provided an image processing apparatus including: a generation unit configured to generate, on a basis of an input image captured by an imaging unit disposed in a vicinity of a user's viewpoint and distance information indicating a distance to an object in each region of the input image, an image indicating the object in the input image located closer to the imaging unit than a predetermined distance in real space; an image display unit configured to display the image, allowing the user to view the object via a display screen; and an amount-of-correction calculation unit configured to calculate, on a basis of the image at mutually different time points, an amount of correction for correcting a display position or display size of an image to be displayed on the image display unit.

The amount-of-correction calculation unit can calculate the amount of correction for correcting the display position, on a basis of an amount of movement, in the image, of a short distance object, which is the object located closer to the imaging unit than the predetermined distance.

In a state where the image as a reference, or the image corrected by the amount of correction and succeeding the image as the reference is being displayed on the image display unit, the amount-of-correction calculation unit can calculate the amount of correction, on a basis of an amount of movement of an operation instruction unit between the image captured when the user moves the operation instruction unit so that the operation instruction unit as the short distance object overlaps with the operation instruction unit on the image being displayed, and the image as the reference, or the image succeeding the image as the reference.

The amount-of-correction calculation unit can calculate the amount of correction for correcting the display size, on a basis of a change of size, in the image, of a short distance object, which is the object located closer to the imaging unit than the predetermined distance.

In a state where the image as a reference, or the image corrected by the amount of correction and succeeding the image as the reference is being displayed on the image display unit, the amount-of-correction calculation unit can calculate the amount of correction, on a basis of a change of size of an operation instruction unit between the image captured when the user moves the operation instruction unit so that the operation instruction unit as the short distance object has a same size as the operation instruction unit on the image being displayed, and the image as the reference.

The amount-of-correction calculation unit can calculate the amount of correction for correcting the display size, on a basis of an amount of movement, in the image, of a specific part of a short distance object, which is the object located closer to the imaging unit than the predetermined distance.

The image display unit can further display a virtual image to be operated by the user. The image processing apparatus can further include a correction unit configured to correct the display position or the display size of the virtual image, on a basis of the amount of correction.

The image processing apparatus can further include: a mask generation unit configured to generate a masked image indicating an unmasked region, the unmasked region being a region of the object located closer to the imaging unit than a distance of the virtual image in space; a mask correction unit configured to correct a position or size of the unmasked region in the masked image, on a basis of the amount of correction; and a mask processing unit configured to remove the unmasked region from the virtual image by performing transparent processing on the virtual image, on the basis of the masked image corrected by the mask correction unit and the amount of correction. The image display unit can display the virtual image subjected to the transparent processing.

The image processing apparatus can further include: an operation correction unit configured to correct, on a basis of the amount of correction, a position on the virtual image operated by the user.

The image display unit can be provided for each of the user's left and right eyes. The amount-of-correction calculation unit can calculate the amount of correction for each of the user's left and right eyes.

According to an aspect of the present technique, there is provided an image processing method or a program including: generating, on a basis of an input image captured by an imaging unit disposed in a vicinity of a user's viewpoint and distance information indicating a distance to an object in each region of the input image, an image indicating the object in the input image located closer to the imaging unit than a predetermined distance in real space; displaying the image on an image display unit allowing the user to view the object via a display screen; and calculating, on a basis of the image at mutually different time points, an amount of correction for correcting a display position or display size of an image to be displayed on the image display unit.

In an aspect of the present technique, on a basis of an input image captured by an imaging unit disposed in a vicinity of a user's viewpoint and distance information indicating a distance to an object in each region of the input image, an image indicating the object in the input image located closer to the imaging unit than a predetermined distance in real space is generated; the image is displayed on an image display unit allowing the user to view the object via a display screen; and on a basis of the image at mutually different time points, an amount of correction for correcting a display position or display size of an image to be displayed on the image display unit is calculated.

Advantageous Effects of Invention

According to an aspect of the present technique, operability can be improved.

Note that, the effects explained herein are not limiting, and any of the effects described in the present disclosure may be brought about.

DESCRIPTION OF EMBODIMENTS

Hereinafter, there will be explained embodiments to which the present technique is applied with reference to drawings.

<First Embodiment>
<Outline of the Present Technique>

The present technique is intended to provide a realistic sense of touch by performing 3D presentation on the basis of a view seen with the naked eye of a user wearing a see-through head mount display and virtual image, and thereby realize a natural user interface of an equivalent level to that of reality. The present technique, in particular, allows low cost implementation of a user interface of a see-through head mount display having a quick responsiveness and a high degree of freedom, which provides the user with a natural feeling.

For example, the present technique can be applied to the operation of various kinds of electronic device such as an audio device, a multi-function type mobile phone, an electronic book reader, and also applied to a medical field, a game machine operation, a concert, a movie, an attraction, and the like.

Figure 1:
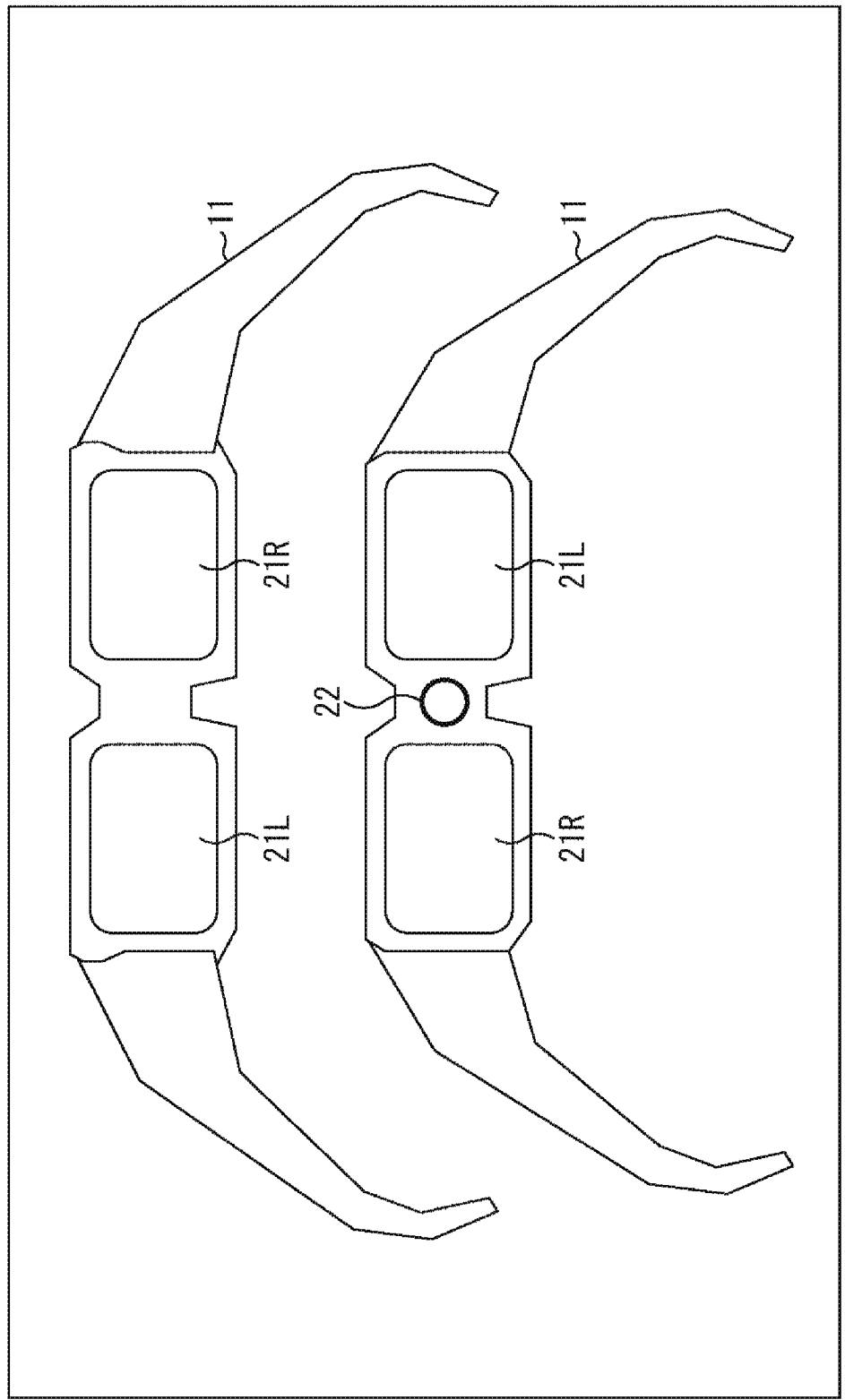
FIG. 1 is a diagram illustrating an exemplary configuration of an appearance of a display apparatus.

In the following, the present technique will be explained as one example of applying the present technique to a glass-type display apparatus. In such a case, as shown in FIG. 1 on the upper side, for example, an image display unit 21L and an image display unit 21R are provided on the rear side of a display apparatus 11, that is, on the plane facing the left and right eyes of a user when the user wears the display apparatus 11.

The image display unit 21L and the image display unit 21R, which include semi-transparent see-through display devices, are display components that present images respectively to the left eye and the right eye of the user. In addition, the user can also view the real space lying ahead in the line-of-sight direction via the display screens of the image display unit 21L and the image display unit 21R.

Note that, in the following, when the image display unit 21L and the image display unit 21R do not have to be distinguished in particular, each of them will be also simply called an image display unit 21.

In addition, an imaging unit 22 is provided at a position between the image display unit 21L and the image display unit 21R on the front side of the display apparatus 11, i.e., the side located opposite to the side of the user's eyes when the user wears the display apparatus 11. In other words, the imaging unit 22 is disposed in the vicinity of the user's viewpoint. The imaging unit 22, including a camera with range finding capability, performs image capturing, as well as measuring the distance to an object located in front of the user wearing the display apparatus 11.

Figure 2:
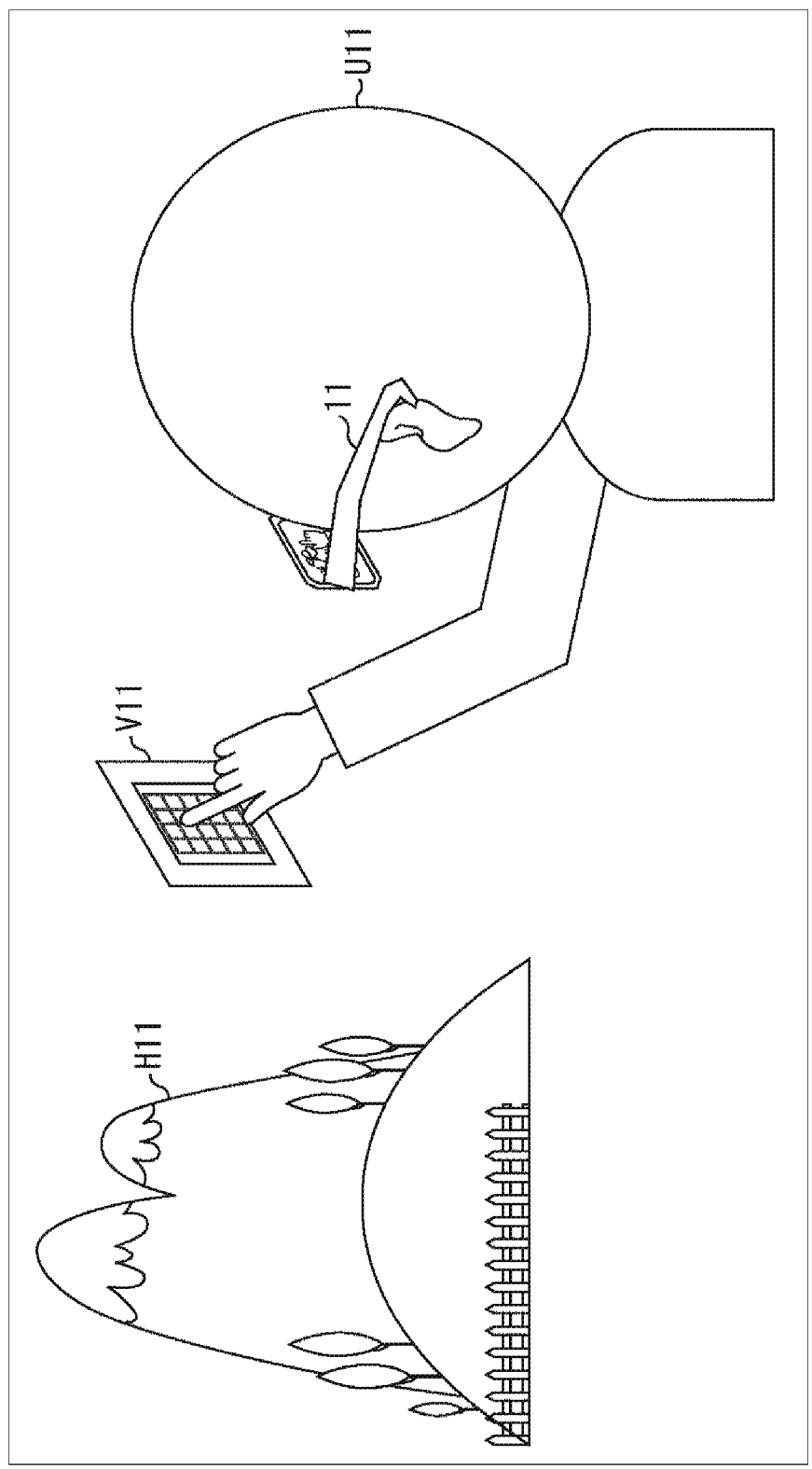
FIG. 2 is a diagram explaining operation for a virtual image.

The display apparatus 11 which is a see-through head mount display as described above is put on the head of a user U11 for use, as illustrated in FIG. 2. In the present example, the user views a real object H11 via the image display unit 21 of the display apparatus 11.

In addition, the imaging unit 22 provided in the display apparatus 11 measures the distance to each object in front of the user U11. The display apparatus 11 then generates an output image by performing transparent processing on a part of a region, in a predetermined virtual image V11, of the object located closer to the user U11 than the virtual image V11, and displays the acquired output image on the image display unit 21. Therefore, the part of the user's hand or the like in the output image is subjected to the transparent processing so that no image is displayed at the part of the user's hand. In other words, overlapping of an image with the user's hand is prevented and thus a more realistic augmented reality is realized.

Here, the virtual image V11 is assumed to be an image of the 3D user interface such as, for example, a display screen of a virtual terminal to be operated by the user, which is operated when instructing the display apparatus 11 to perform various kinds of processing. The virtual image V11 is disposed on a virtual space, i.e., an augmented reality space.

The user U11, while watching the output image displayed on the image display unit 21, performs touch operation for the virtual image V11 by stretching a hand to the virtual image V11 which is displayed as if existing in a real space. That is, the user performs operation such as pushing of a button displayed on the virtual image V11.

Then, when the user U11 performs the operation for the virtual image V11, the display apparatus 11 performs processing corresponding to the operation.

In the display apparatus 11, the virtual images V11 on the output images displayed on the image display unit 21L and the image display unit 21R have parallaxes, and the output images presented to the left and right eyes of the user U11 form stereoscopic images each having a parallax.

In this manner, the display apparatus 11 displays a stereoscopic image as the output image overlapped in a see-through manner with an actually viewed image, and thereby can realize a user interface which allows the user to easily have a feeling of distance and not to feel stress. This user interface is a space touch interface using a real 3D augmented reality.

<Exemplary Configuration of the Display Apparatus>

Figure 3:
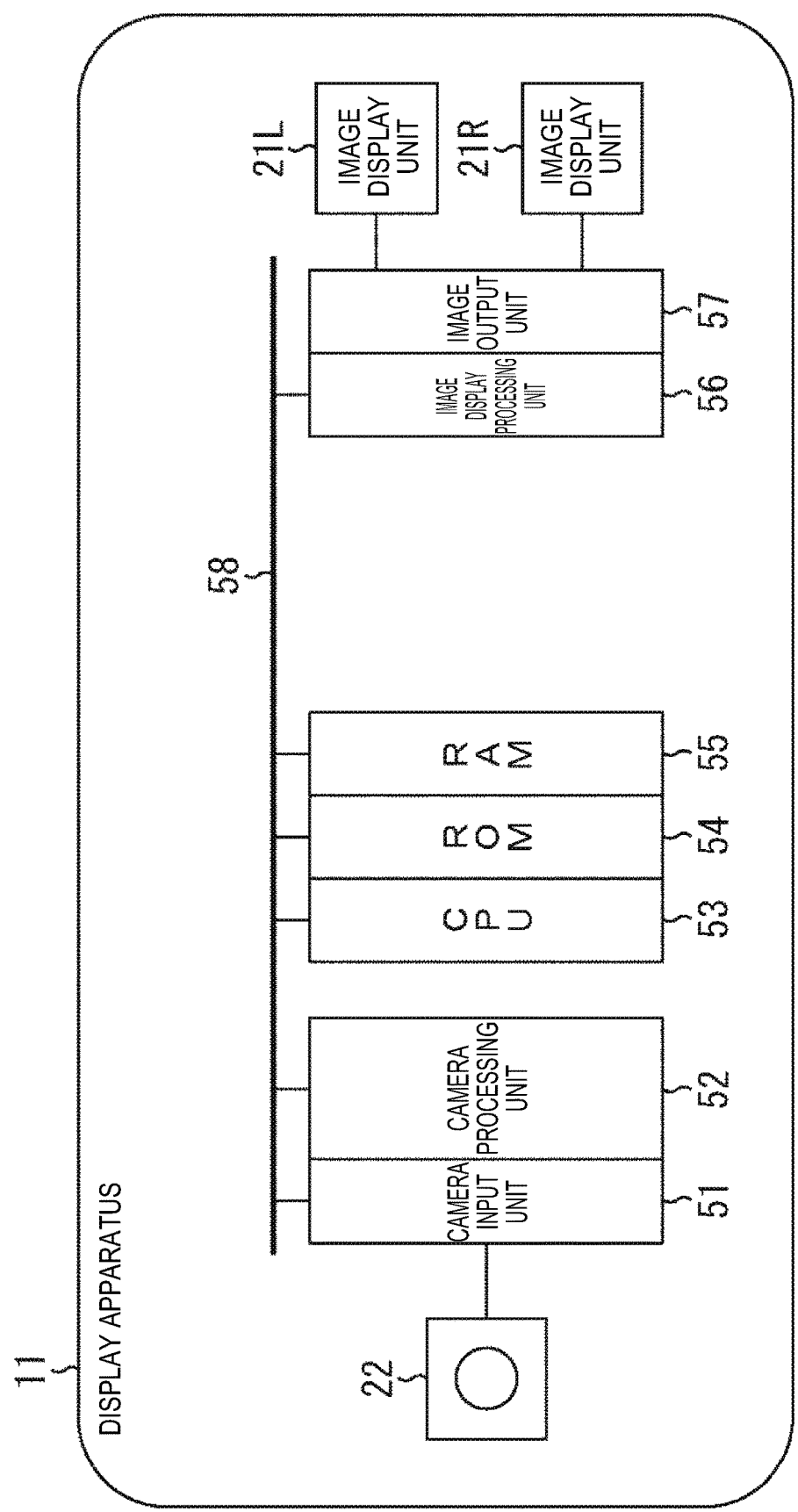
FIG. 3 is a diagram illustrating an exemplary configuration of a display apparatus.

Next, there will be explained a specific configuration of the display apparatus 11 shown in FIG. 1. FIG. 3 is a diagram illustrating an exemplary configuration of the display apparatus 11. Note that, in FIG. 3, the same sign is attached to a part corresponding to a part in FIG. 1 and the explanation thereof will be omitted appropriately.

The display apparatus 11 includes the imaging unit 22 with range finding capability, a camera input unit 51, a camera processing unit 52, a CPU 53, a ROM (Read Only Memory) 54, a RAM (Random Access Memory) 55, an image display processing unit 56, an image output unit 57, a bus 58, the image display unit 21L, and the image display unit 21R. In the present example, components ranging from the camera input unit 51 to the image display processing unit 56 are interconnected by the bus 58, allowing information and images to be exchanged via the bus 58.

The imaging unit 22 with range finding capability captures an input image and supplies the input image to the camera input unit 51, and also acquires information for measuring the distance to the object and supplies the information to the camera input unit 51. For example, the imaging unit 22 has provided therein pixels of respective colors of R, G and B for acquiring an input image, and pixels for receiving near-infrared light for range finding. The imaging unit 22 outputs pixel data acquired for respective pixels of R, G and B as image data of the input image, and outputs range finding data for each corresponding pixel.

The camera input unit 51 acquires image data of the input image from the imaging unit 22, performs data format conversion of the input image or the like as necessary, and supplies the converted data to the camera processing unit 52. In addition, the camera input unit 51 supplies, directly to the RAM 55 via the bus 58, the distance-to-object information supplied from the imaging unit 22.

The camera processing unit 52 performs correction processing of distortion or the like and developing processing on the input image supplied from the camera input unit 51, and supplies the resultant image to the RAM 55.

The CPU 53 controls the overall operation of the display apparatus 11. For example, the CPU 53 generates an output image on the basis of the distance-to-object information supplied from the RAM 55, and supplies the output image to the image display processing unit 56. Although the distance information may be acquired in any manner, the distance information may be calculated on the basis of Time Of Flight (TOF), for example.

The ROM 54 records various kinds of image such as the virtual image, data, a program, and the like. The RAM 55 records an image, distance information, various kinds of data, a program, and the like temporarily.

The image display processing unit 56 performs image processing such as buffer processing on images supplied from the CPU 53 such as the output image to be displayed on the image display unit 21. The image output unit 57 outputs an image such as the output image subjected to the image processing in the image display processing unit 56 to the image display unit 21 for display.

<Outline of Adjustment Processing>

Next, there will be explained the processing performed by the display apparatus 11.

In the see-through display apparatus 11, for example, detection of an operation instruction unit such as the user's hand instructing an operation is necessary in order to recognize the operation performed by the user on a virtual image. However, there inevitably occurs a gap between the viewpoint position of the imaging unit 22 detecting the operation instruction unit and the viewpoint position of the actual user. This is because the user is viewing the real space via the semi-transparent image display unit 21 in the see-through display apparatus 11, it is difficult to dispose the imaging unit 22 on the user's line of sight.

Accordingly, existence of a gap between the viewpoint positions of the imaging unit 22 and the user causes a slight gap between a position in the augmented reality space recognized by the display apparatus 11 and a position in the augmented reality space viewed by the user, which may lower the operability. Similarly, there also occurs a slight gap between the size of an object in the augmented reality space recognized by the display apparatus 11 and the size of the object in the augmented reality space viewed by the user.

In other words, there occurs a gap between the coordinate systems of the display apparatus 11 and the user.

Accordingly, there is a possibility that, although the user has specified a predetermined position in the augmented reality space, for example, the display apparatus 11 may recognize that a position, which is different from the position specified by the user, is specified, and such a misrecognition becomes a stress for the user. In addition, a gap may also occur in combining of an image being actually viewed and a virtual image thereof.

Therefore, the display apparatus 11 first performs adjustment processing to adjust such a gap in the presentation between the display apparatus 11 and the user, i.e., the recognition gap of position and size.

Specifically, the display apparatus 11 performs, as the adjustment processing, processing of correcting the position gap in the output image, and the size gap of an object in the output image. In the following, predetermined directions perpendicular to each other in the output image will be referred to as the X-direction and the Y-direction, and the display position gap in the XY coordinate system whose axial directions being the X-direction and the Y-direction will be also referred to as the position gaps in the XY directions. In addition, the size gap of an object in the output image (display size) will be also referred to as the scale gap in the following.

Figure 4:
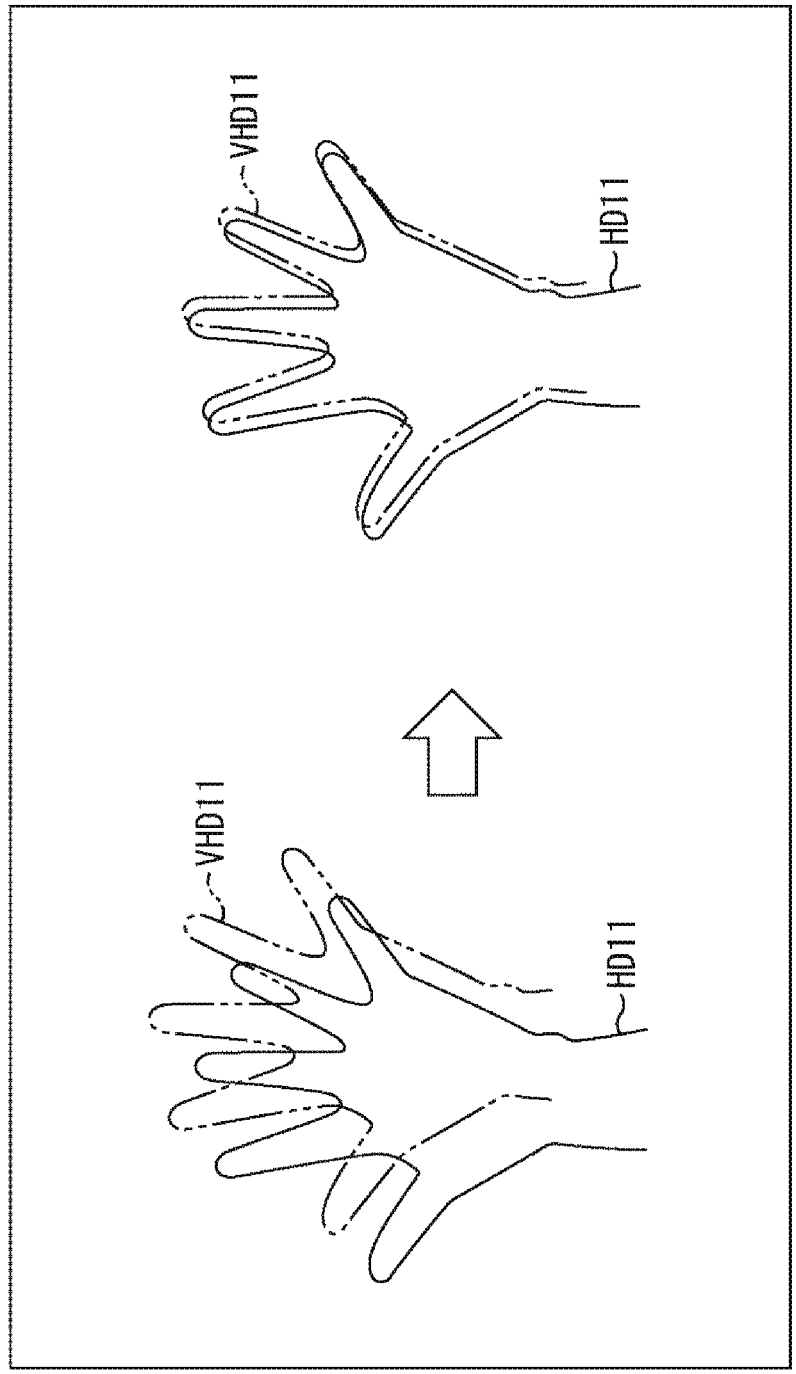
FIG. 4 is a diagram explaining operation when performing position adjustment.

For example, when the position gaps in the XY directions are adjusted, an adjustment image VHD11, which is an image of the user's hand captured by the display apparatus 11, is displayed on the image display unit 21 as the output image, as illustrated on the left side of FIG. 4. In such a case, the user's hand acts as the operation instruction unit.

For example, the adjustment image VHD11 is an image representing, semi-transparently or only the contour of, the region of the user's hand in the input image at a time slightly before the current time.

Accordingly, it turns out that a user viewing the image display unit 21 is presented with the user's actual hand HD11 seen via the image display unit 21, and also the adjustment image VHD11 which is an image of the hand HD11 at a slightly preceding time.

Here, when a gap exists between the position of the adjustment image VHD11 visible to the user and the actual position of the hand HD11 in a state where the user is not moving the hand HD11, the amount of gap becomes the amount of position gaps in the XY directions.

When the position gaps in the XY directions are adjusted, the user moves the hand HD11 vertically and horizontally so that his/her hand HD11 overlaps with the adjustment image VHD11 as illustrated on the right side of the drawing. Then, upon determining that the hand HD11 has overlapped with the adjustment image VHD11, the user notifies the display apparatus 11 of completion of the position gap adjustment in the XY directions by keeping the hand HD11 still for a certain period, or giving a determination instruction via an audio or another interface. In other words, the user determines completion of the adjustment. Here, it is conceivable that the user performs a physical touch operation on the display apparatus 11 as a determination instruction via another interface, for example.

When the user performs such an operation while adjusting the position gaps in the XY directions, the display apparatus 11 calculates the amount of correction of position gaps in the XY directions on the basis of the amount of movement of the position of the user's hand indicated by the adjustment image VHD11.

In other words, the amount of correction of position gaps in the XY directions in the adjustment image VHD11 is calculated on the basis of the amount of movement of the hand from the position of the user's hand in the adjustment image VHD11 displayed when the adjustment is determined by the user to the position of the user's hand in the adjustment image VHD11 displayed when the adjustment processing is started. On this occasion, the position in the XY directions turns out to be corrected (adjusted) in an opposite direction to the actual movement direction of the user's hand.

In addition, although an example has been explained here in which the user moves his/her hand vertically and horizontally when adjusting the position gaps in the XY directions, the amount of correction may be input to the display apparatus 11 by any other methods.

Figure 5:
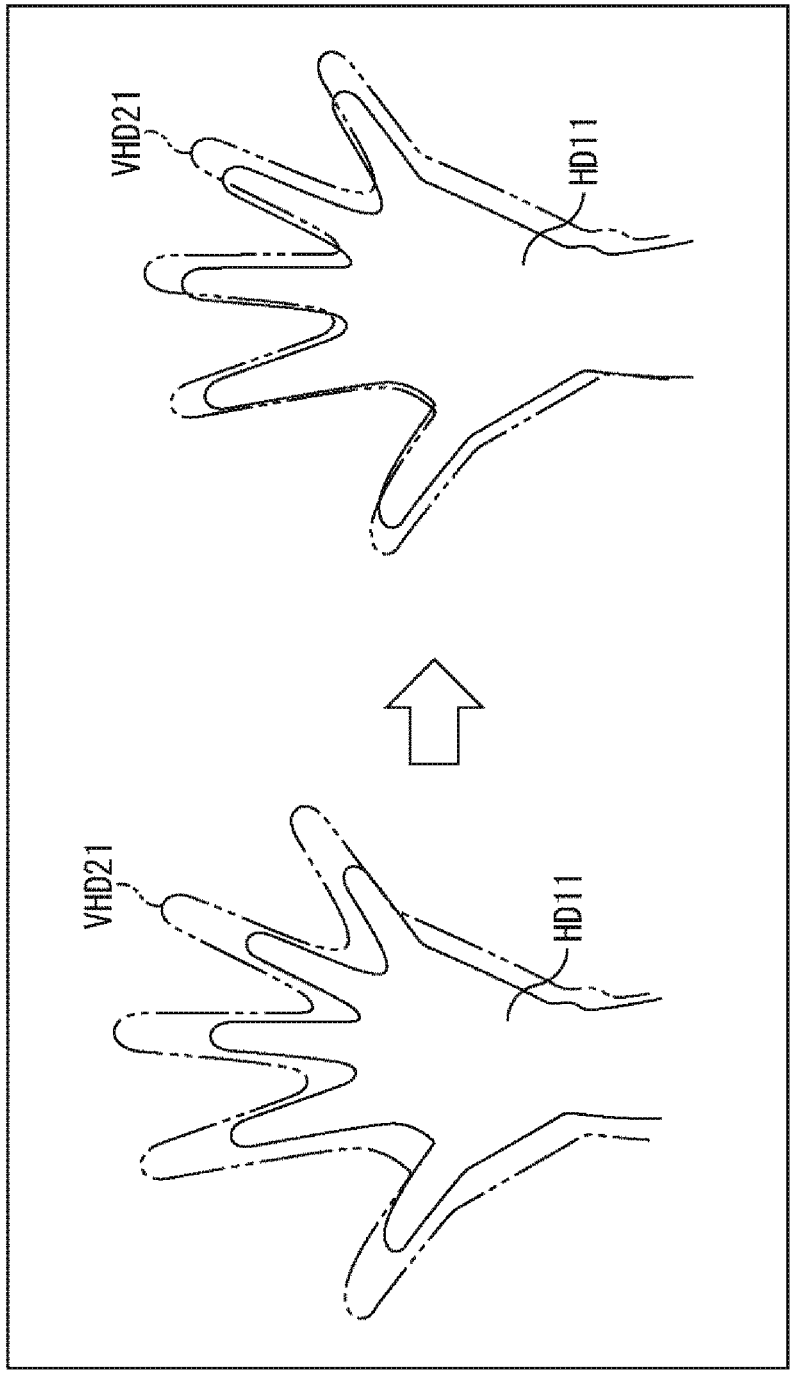
FIG. 5 is a diagram explaining operation when performing size adjustment.

Furthermore, when the scale (size) gap of the output image is adjusted, an adjustment image VHD21, which is an image of the user's hand captured by the display apparatus 11, is displayed on the image display unit 21 as the output image, as illustrated on the left side of FIG. 5. In such a case, the user's hand acts as the operation instruction unit. For example, the adjustment image VHD21 is an image representing, semi-transparently or only the contour of, the region of the user's hand in the input image at a time slightly before the current time.

Note that, in FIG. 5, the same sign is attached to a part corresponding to a part in FIG. 4 and the explanation thereof will be omitted appropriately.

Also in the above example, the user can view his/her actual hand HD11 and the adjustment image VHD21, which is an image at a time slightly before of the hand HD11.

Here, when a gap exists between the size of the adjustment image VHD21 visible to the user and the size of the actual hand HD11 in a state where the user is not moving the hand HD11, the difference between the sizes, i.e., the difference between the display magnifications becomes the amount of scale gap.

When adjusting the scale gap, the user moves the hand HD11 back and forth, i.e., in the depth direction as illustrated on the right side of the drawing so that his/her hand HD11 overlaps with the adjustment image VHD21. Then, upon determining that the hand HD11 has overlapped with the adjustment image VHD21, the user notifies the display apparatus 11 of completion of the scale gap adjustment by keeping the hand HD11 still for a certain period, or giving a determination instruction via an audio or another interface. In other words, the user determines completion of the adjustment.

When the user performs such an operation while adjusting the scale gap, the display apparatus 11 calculates the amount of correction of scale gap, on the basis of the amount of change of the size of the user's hand indicated by the adjustment image VHD21, i.e., the amount of change in the display magnification.

In other words, the amount of correction of scale gap in the adjustment image VHD21 is calculated on the basis of the amount of change from the size of the user's hand in the adjustment image VHD21 displayed when the adjustment is determined by the user to the size of the user's hand in the adjustment image VHD21 displayed when the adjustment processing is started. On this occasion, the display scale is corrected (adjusted) such that the object in the output image is displayed in a reduced manner when the user moves his/her hand closer for adjustment, whereas the object in the output image is displayed in an enlarged manner when the user moves his/her hand farther away for adjustment.

Figure 6:
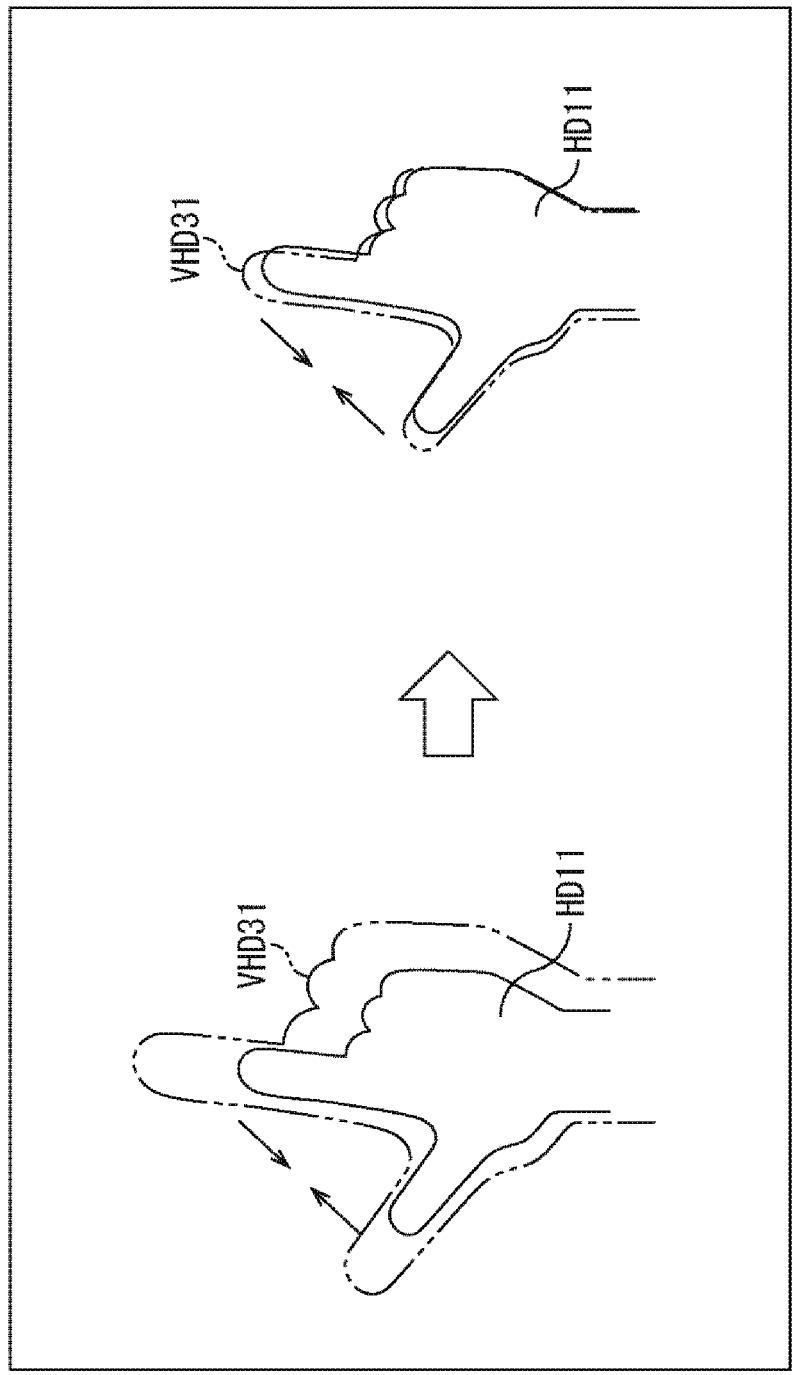
FIG. 6 is a diagram explaining operation when performing size adjustment.

In addition, although an example has been explained here in which the user moves his/her hand in a back and forth direction when adjusting the scale gap, the amount of correction may be input to the display apparatus 11 by any other methods. For example, adjustment of the scale gap may be performed by the user's manual operation such as pinch-in or pinch-out, as illustrated in FIG. 6. Note that, in FIG. 6, same sign is attached to a part corresponding to a part in FIG. 5 and the explanation thereof will be omitted appropriately.

In the present example, an adjustment image VHD31 is displayed to appear larger to the user than his/her hand HD11, as illustrated on the left side of the drawing, and therefore a pinch-in operation is performed to adjust the scale gap so that the object in the output image is displayed in a reduced manner. Accordingly, the adjustment image VHD31 is displayed in a reduced manner to be as large as the actual size of the user's hand HD11, as illustrated on the right side of the drawing.

Also in the above case, completion of the scale gap adjustment is determined when the user keeps the hand HD11 still for a certain period, or gives a determination instruction via an audio or another interface (physical touch operation on the display apparatus 11). Additionally, in the present example, the amount of correction is calculated on the basis of the amount of movement of a particular part of the user's hand such as the thumb or the forefinger. Note that, a pinch-out operation is performed when an object in the output image is displayed in an enlarged manner.

Adjustment of display gaps in the output image such as position gaps in the XY directions or a scale gap is performed in the display apparatus 11 by the aforementioned operation. Accordingly, the gaps between the position and size of an object being recognized by the display apparatus 11, and the position and size of the object in the augmented reality space being viewed by the user are corrected, so that the user can operate the display apparatus 11 without stress. In other words, it is possible to improve the operability of the display apparatus 11.

Subsequently, with reference to FIG. 7, there will be explained the flow of the adjustment processing explained above. Note that, in FIG. 7, same sign is attached to a part corresponding to a part in FIG. 3 and the explanation thereof will be omitted appropriately.

Figure 7:
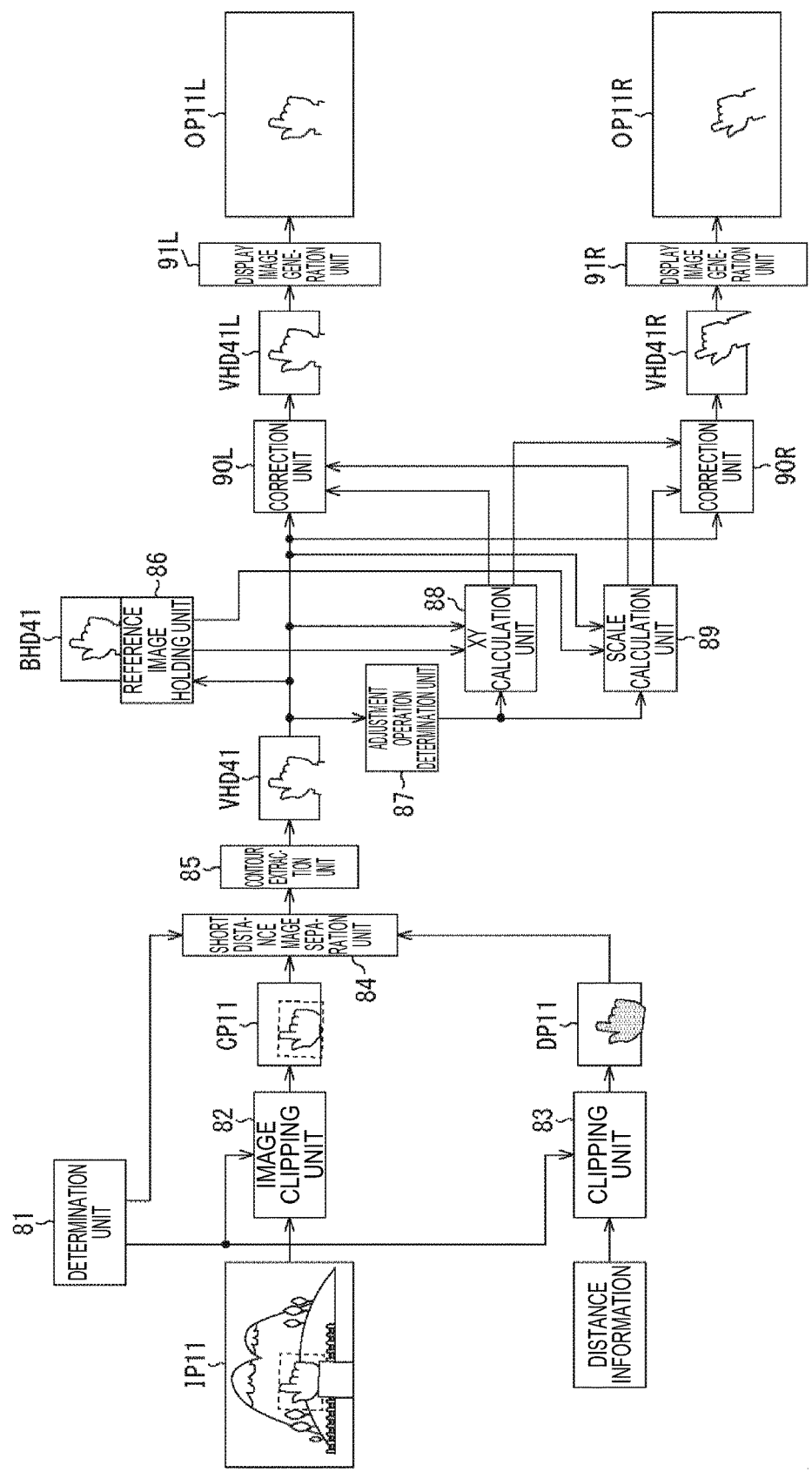
FIG. 7 is a diagram explaining display gap adjustment.

In the example of FIG. 7, a determination unit 81, an image clipping unit 82, a clipping unit 83, a short distance image separation unit 84, the contour extraction unit 85, an adjustment operation determination unit 87, an XY calculation unit 88, a scale calculation unit 89, a correction unit 90L, a correction unit 90R, the display image generation unit 91L, and a display image generation unit 91R are implemented, for example, by the CPU 53 executing a program stored in the ROM 54. In addition, a reference image holding unit 86, for example, is implemented by the RAM 55.

Note that, in the following, when the correction unit 90L and the correction unit 90R do not have to be distinguished in particular, each of them will be also simply called a correction unit 90, and when the display image generation unit 91L and the display image generation unit 91R do not have to be distinguished in particular, each of them will be also simply called a display image generation unit 91.

In the display apparatus 11, an input image IP11 is first captured by the imaging unit 22, and distance information is calculated from the information acquired by the imaging unit 22. Subsequently, the input image IP11 is supplied to the image clipping unit 82 and the distance information is supplied to the clipping unit 83.

In addition, by the determination unit 81, there are determined an adjustment size and position indicating the size and position of a region in which the user's hand is a target of detection in the adjustment processing, and a distance indicating a range in the depth direction in which the user's hand is a target of detection in the adjustment processing. The determination unit 81 then supplies the adjustment size and position to the image clipping unit 82 and the clipping unit 83, and supplies the distance to the short distance image separation unit 84.

Here, the adjustment size and position are the size and position of a region including the region in which the user's hand is likely to be detected in the input image IP11. For example, it is assumed that the user's hand will be detected in the proximity of the center of the input image IP11. In addition, the distance in which the user's hand is a target of detection is the distance in the real space, or more specifically the distance from the imaging unit 22 in the three-dimensional augmented reality space to the farthest position where the user's hand is likely to be detected.

The image clipping unit 82 clips, as a clipped image CP11, a region in the input image IP11 defined on the basis of the adjustment size and position supplied from the determination unit 81, and supplies the clipped image CP11 to the short distance image separation unit 84. The region clipped from the input image IP11 on the basis of the adjustment size and position is set to a region including the user's hand moving to adjust the display gap. Therefore, a substantially large region in the input image IP11 is clipped.

In addition, the clipping unit 83 clips, as a distance image DP11, a region defined on the basis of the adjustment size and position in distance information supplied from the determination unit 81, and supplies the distance image DP11 to the short distance image separation unit 84. Here, it is assumed that the regions clipped by the image clipping unit 82 and the clipping unit 83 are the same region. In such a case, the distance information is information indicating the distance to an object in each region in the input image IP11 and therefore the distance image DP11 becomes information indicating the distance to an object in each region in the clipped image CP11.

The short distance image separation unit 84 extracts, as a short distance image, the region of the user's hand in the clipped image CP11 on the basis of the distance supplied from the determination unit 81 and the distance image DP11 supplied from the clipping unit 83, and supplies the short distance image to the contour extraction unit 85.

For example, a region in the clipped image CP11 is extracted as the region of the user's hand, in which the distance indicated by the distance image DP11 is shorter than the distance supplied from the determination unit 81. More specifically, in the real space, a region of a short distance object located closer to the imaging unit 22 than the position determined by the distance supplied from the determination unit 81 is extracted from the clipped image CP11.

The contour extraction unit 85 extracts the contour of a short distance object in the short distance image on the basis of the short distance image supplied from the short distance image separation unit 84, and the image of the contour is used as an adjustment image VHD41. Accordingly, the contour of the region of the user's hand is extracted. The contour extraction unit 85 supplies the adjustment image VHD41 acquired in this manner to components ranging from the adjustment operation determination unit 87 to the correction unit 90, for each frame of the input image IP11.

In addition, the contour extraction unit 85 supplies to the reference image holding unit 86, and causes it to hold, the adjustment image VHD41 acquired at the start of the adjustment processing as an adjustment image serving as a reference when calculating the amount of correction of the position gaps in the XY directions and the scale gap. In the following, the adjustment image VHD41 to be held in the reference image holding unit 86 will be also referred to as the reference image. In the present example, the adjustment image VHD41 acquired at the start of the adjustment processing is held in the reference image holding unit 86 as a reference image BHD41.

The adjustment operation determination unit 87 determines whether or not the user has performed an operation for scale adjustment on the basis of the change in the region of the user's hand in the adjustment image VHD41 supplied from the contour extraction unit 85, and supplies the determination result to the XY calculation unit 88 and the scale calculation unit 89.

According to the determination result supplied from the adjustment operation determination unit 87, the XY calculation unit 88 calculates, and supplies to the correction unit 90L or the correction unit 90R, the amount of correction of position gaps in the XY directions on the basis of the adjustment image VHD41 of the current frame supplied from the contour extraction unit 85 and the reference image BHD41 held in the reference image holding unit 86.

According to the determination result supplied from the adjustment operation determination unit 87, the scale calculation unit 89 calculates, and supplies to the correction unit 90L or the correction unit 90R, the amount of correction of scale gap, on the basis of the adjustment image VHD41 of the current frame supplied from the contour extraction unit 85 and the reference image BHD41 held in the reference image holding unit 86. The scale calculation unit 89 may calculate the amount of correction using the adjustment image VHD41 of the current frame and the immediately preceding frame.

The correction unit 90L corrects the position and size (scale) of the region of the user's hand in the adjustment image VHD41 supplied from the contour extraction unit 85, on the basis of the amount of correction of position gaps in the XY directions supplied from the XY calculation unit 88 and the amount of correction of scale gap supplied from the scale calculation unit 89, and supplies a resultant adjustment image VHD41L to the display image generation unit 91L.

The correction unit 90R corrects the position and size of the region of the user's hand in the adjustment image VHD41 supplied from the contour extraction unit 85, on the basis of the amount of correction of position gaps in the XY directions supplied from the XY calculation unit 88 and the amount of correction of scale gap supplied from the scale calculation unit 89, and supplies a resultant adjustment image VHD41R to the display image generation unit 91R.

The display image generation unit 91L generates an output image OP11L in which the adjustment image VHD41L supplied from the correction unit 90L is displayed at an appropriate position, and also supplies the acquired output image OP11L to the image display unit 21L for display.

The display image generation unit 91R generates an output image OP11R in which the adjustment image VHD41R supplied from the correction unit 90R is displayed at an appropriate position, and also supplies the acquired output image OP11R to the image display unit 21R for display.

The display apparatus 11 calculates the amount of correction of position gaps in the XY directions and the amount of correction of scale gap by repeating the aforementioned processing.

<Explanation of Adjustment Processing>

Next, the adjustment processing explained above will be explained in more detail. In the following, with reference to the flowchart of FIG. 8, there will be explained the adjustment processing by the display apparatus 11.

The adjustment processing is started when, for example, the user operates a predetermined operation unit of the display apparatus 11, operates the operation unit of the virtual image displayed on the image display unit 21, or manually performs a predetermined operation.

At step S11, the display apparatus 11 performs amount-of-correction calculation processing to calculate the amount of correction of position gaps in the XY directions, or the amount of correction of scale gap for the right eye, i.e., the amount of correction in the output image to be displayed on the image display unit 21R.

Figure 9:
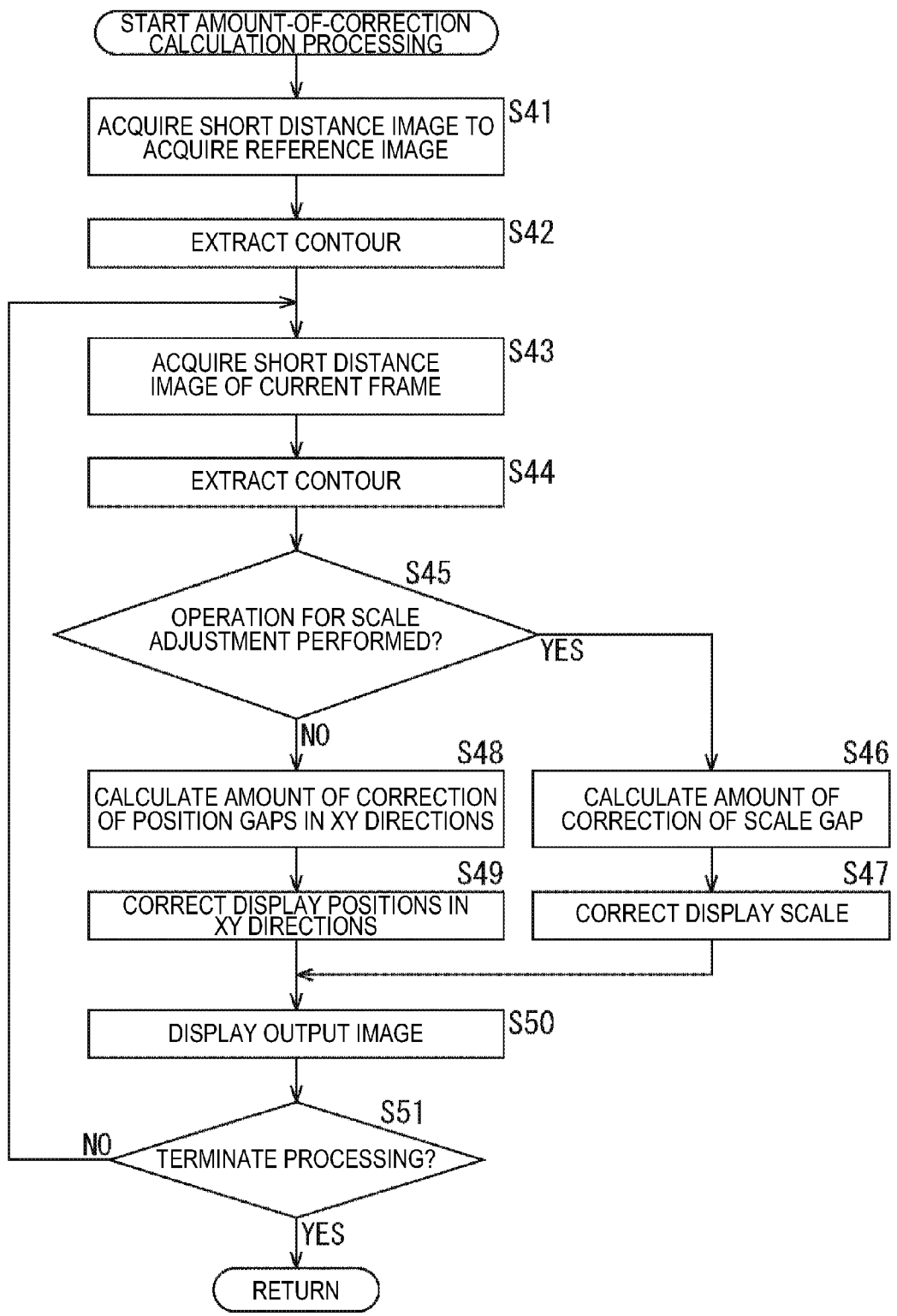
FIG. 9 is a flowchart explaining amount-of-correction calculation processing.

Here, with reference to the flowchart of FIG. 9, there will be explained the amount-of-correction calculation processing.

At step S41, the display apparatus 11 acquires a short distance image in order to acquire a reference image.

In other words, the imaging unit 22 captures an input image and also outputs distance-to-object information.

The image clipping unit 82 of FIG. 7 acquires an input image from the imaging unit 22, clips a region in input image defined by the adjustment size and position supplied from the determination unit 81, and supplies the acquired clipped image to the short distance image separation unit 84.

In addition, the clipping unit 83 clips, as a distance image, a region of the distance information defined by the adjustment size and position supplied from the determination unit 81, and supplies the distance image to the short distance image separation unit 84.

The short distance image separation unit 84 extracts the region of the user's hand in the clipped image on the basis of the clipped image supplied from image clipping unit 82 and the distance image supplied from the clipping unit 83, using the distance supplied from the determination unit 81 as a threshold value, and supplies the short distance image to the contour extraction unit 85.

At step S42, the contour extraction unit 85 extracts the contour of the region of the user's hand from the short distance image supplied from the short distance image separation unit 84, and supplies the image of the contour to the reference image holding unit 86 as a reference image to be held therein.

In addition, the contour extraction unit 85 supplies the acquired reference image to the display image generation unit 91 via the correction unit 90. The display image generation unit 91 generates an output image on the basis of the reference image supplied from the contour extraction unit 85, and supplies the output image to the image display unit 21 for display. The output image displayed on the image display unit 21 in this manner is an image corrected only by the initial correction value.

When the output image is displayed, the user moves his/her hand vertically, horizontally, or back and forth in the depth direction while viewing the image display unit 21 so that his/her hand overlaps with the contour of the hand (adjustment image) displayed on the output image. Since the amount-of-correction calculation processing corresponding to step S11 calculates the amount of correction for the right eye, the user moves his/her hand while viewing the image display unit 21R.

At step S43, the display apparatus 11 acquires a short distance image of the current frame. In other words, a process similar to that of step S41 is performed, whereby an image of the region of the user's hand on the input image in the current frame is acquired as the short distance image.

At step S44, the contour extraction unit 85 extracts a contour of the region of the user's hand from the short distance image supplied from the short distance image separation unit 84, and supplies the image of the contour to components ranging from the adjustment operation determination unit 87 to the correction unit 90 as an adjustment image.

At step S45, the adjustment operation determination unit 87 determines whether or not the user has performed an operation for scale adjustment on the basis of adjustment images for several latest frames supplied from the contour extraction unit 85, and supplies the determination result to the XY calculation unit 88 and the scale calculation unit 89.

In the example illustrated in FIG. 5, for example, it is determined that an operation of scale adjustment has been performed when the size of the region of the user's hand on the adjustment image has changed over time. Additionally, in the example illustrated in FIG. 6, for example, the adjustment operation determination unit 87 attempts to detect a pinch-in operation and pinch-out operation on the basis of the change in the region of a specific part such as a finger of the user's hand on the adjustment image, and when one of the two operations is detected, it is determined that an operation of scale adjustment has been performed.

When it is determined at step S45 that an operation of scale adjustment has been performed, the process flow proceeds to step S46.

At step S46, the scale calculation unit 89 calculates, and supplies to the correction unit 90, the amount of correction of scale gap, on the basis of the adjustment image of the current frame supplied from the contour extraction unit 85 and the reference image held in the reference image holding unit 86.

Specifically, in the example illustrated in FIG. 5, for example, the scale calculation unit 89 calculates the amount of correction of scale gap, on the basis of the ratio between the size of the region of the user's hand in the reference image and the size of the region of the user's hand in the adjustment image of the current frame. In other words, the scaling rate when enlarging or reducing the region of the user's hand in the reference image so that the region of the user's hand in the reference image has the same size as the region of the user's hand in the adjustment image is used as the amount of correction of scale gap. It is also conceivable to calculate the ratio of the sizes of the region of the user's hand between the adjustment image of the current frame and an adjustment image preceding the current frame by several frames which are later frames than the frame of the reference image, and update the amount of correction of scale gap, on the basis of the calculated ratio.

Additionally, in the example illustrated in FIG. 6, for example, a value obtained by further adding, to the amount of correction of scale gap at the current time, the amount of correction according to the amount of movement of a specific part such as a finger of the user's hand in the adjustment image between predetermined frames is used as the newly calculated amount of correction of scale gap. In other words, the current amount of correction is changed by an amount determined by the amount of movement of a finger in a pinch-in or pinch-out operation.

As thus described, the scale calculation unit 89 calculates the amount of correction of scale gap, on the basis of adjustment images at mutually different time points. In the amount-of-correction calculation processing corresponding to step S11, the amount of correction for the right eye is calculated and therefore the amount of correction of scale gap acquired at step S46 is supplied to the correction unit 90R.

At step S47, the correction unit 90 corrects the display scale (display size), on the basis of the amount of correction of scale gap supplied from the scale calculation unit 89.

In the amount-of-correction calculation processing corresponding to step S11, for example, the correction unit 90R corrects the display scale of the adjustment image by enlarging or reducing the adjustment image supplied from the contour extraction unit 85 on the basis of the amount of correction of scale gap supplied from the scale calculation unit 89, and supplies the corrected image to the display image generation unit 91R. Subsequently, the process flow proceeds to step S50.

Additionally, when it is determined at step S45 that an operation for scale adjustment has not been performed, the process flow proceeds to step S48 because the user has not performed an operation for correcting the position gaps in the XY directions.

At step S48, the XY calculation unit 88 calculates, and supplies to the correction unit 90, the amount of correction of position gaps in the XY directions on the basis of adjustment image of the current frame supplied from the contour extraction unit 85 and the reference image held in the reference image holding unit 86.

In the example illustrated in FIG. 4, for example, the XY calculation unit 88 calculates the amount of correction of position gaps in the XY directions on the basis of the distance in the XY directions between the position of the region of the user's hand in the reference image and the position of the region of the user's hand in the adjustment image of the current frame. In other words, the direction and distance of movement when moving the region of the user's hand in the adjustment image to the region of the user's hand in the reference image are used as the amount of correction of position gaps in the XY directions. It is also conceivable to calculate the direction and amount of movement of the region of the user's hand between the adjustment image of the current frame and an adjustment image preceding the current frame by several frames which are later frames than the frame of the reference image, and update the amount of correction of position gaps in the XY directions, on the basis of the calculated direction and amount of movement.

As thus described, the XY calculation unit 88 calculates the amount of correction of position gaps in the XY directions on the basis of adjustment images at mutually different time points. In the amount-of-correction calculation processing corresponding to step S11, the amount of correction for the right eye is calculated and therefore the amount of correction of position gaps in the XY directions acquired at step S48 is supplied to the correction unit 90R.

At step S49, the correction unit 90 corrects the display positions in the XY directions on the basis of the amount of correction of position gaps in the XY directions supplied from the XY calculation unit 88.

In the amount-of-correction calculation processing corresponding to step S11, for example, the correction unit 90R corrects the display position of the adjustment image by moving the adjustment image supplied from the contour extraction unit 85 in the XY directions on the basis of the amount of correction of position gaps in the XY directions supplied from the XY calculation unit 88, and supplies the corrected image to the display image generation unit 91R. Subsequently, the process flow proceeds to step S50.

When the display scale is corrected at step S47, or the display position is corrected at step S49, the display image generation unit 91 generates and displays an output image at step S50, on the basis of the adjustment image supplied from the correction unit 90. In other words, the display image generation unit 91 supplies the generated output image to the image display unit 21 via the bus 58, the image display processing unit 56 and the image output unit 57, for display.

Accordingly, an image semi-transparently displaying the user's hand at a slightly preceding time, more specifically an image of the contour of the user's hand is displayed as the output image. Therefore, the user can know whether or not the contour of the hand after display gap correction overlaps with his/her actual hand, i.e., whether or not the display gap has been completely corrected. For example, upon determining that the display gap has been corrected, the user keeps his/her hand still (stopped) for a while, and determines completion of adjustment operation.

At step S51, the adjustment operation determination unit 87 determines whether or not to terminate the processing on the basis of adjustment images for several latest frames supplied from the contour extraction unit 85. For example, when the region of the user's hand has not moved for a predetermined time, it is determined that the display gap has been corrected and the processing is to be terminated.

When it is determined at step S51 that the processing is not to be terminated, i.e., that the display gap has not been corrected yet, the process flow returns to step S43 and the aforementioned processing is repeatedly performed.

Figure 8:
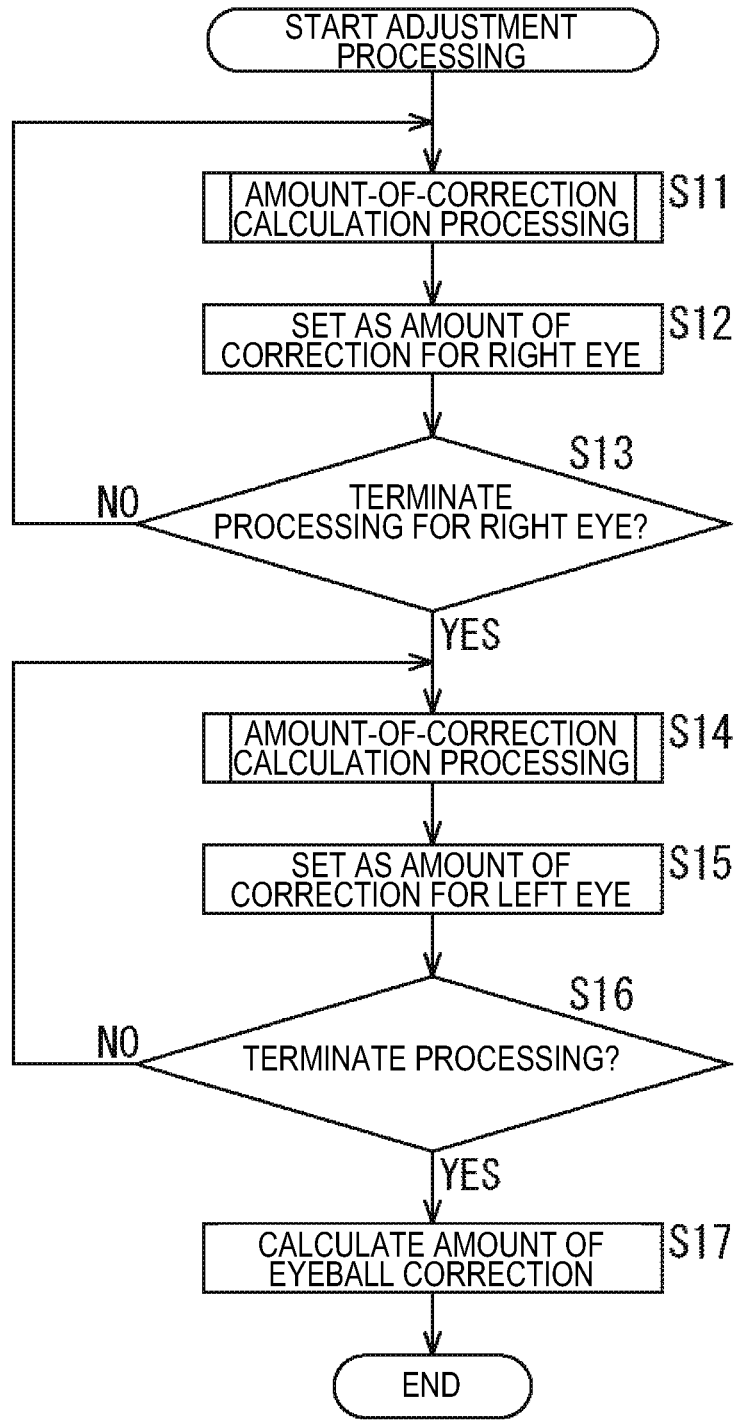
FIG. 8 is a flowchart explaining adjustment processing.

When, on the contrary, it is determined at step S51 that the processing is to be terminated, the amount-of-correction calculation processing is terminated and subsequently the process flow proceeds to step S12 of FIG. 8.

Returning to the explanation of the flowchart of FIG. 8, when the process of step S11 is performed, the process of step S12 is subsequently performed.

In other words, the CPU 53 sets, at step S12, the amount of correction of position gaps in the XY directions calculated by the process of step S11 or the amount of correction of scale gap to be the amount of correction of position gaps in the XY directions or the amount of correction of scale gap for the right eye, or to put it another way, the amount of correction for correcting the display gap of the image displayed on the image display unit 21R and presented to the user's right eye.

At step S13, the CPU 53 determines whether or not to terminate the processing of calculating the amount of correction for the right eye.

When, for example, after having performed an operation for correcting the scale gap of the right eye, the user subsequently performs an operation for correcting the position gaps in the XY directions of the right eye at the determination timing of step S13, the processing of calculating the amount of correction for the right eye is determined not to be terminated.

Alternatively, when, for example, after having performed an operation for correcting the scale gap of the right eye and gaps in the XY directions, the user subsequently performs an operation to start correcting the display gap of the left eye, the processing of calculating the amount of correction for the right eye is determined to be terminated.

When it is determined at step S13 that the processing of calculating the amount of correction for the right eye is not to be terminated, the process flow returns to step S11 and the aforementioned processing is repeatedly performed.

When, on the contrary, it is determined at step S13 that the processing of calculating the amount of correction for the right eye is to be terminated, the process flow proceeds to step S14.

At step S14, the display apparatus 11 performs the amount-of-correction calculation processing to calculate the amount of correction of position gaps in the XY directions or the amount of correction of scale gap for the left eye, i.e., the amount of correction in the output image to be displayed on the image display unit 21L.

Since the amount-of-correction calculation processing performed at step S14 is similar to the amount-of-correction calculation processing explained with reference to FIG. 9, the explanation thereof will be omitted. However, the amount-of-correction calculation processing performed at step S14 calculates the amount of correction of display gap of the output image to be displayed on the image display unit 21L instead of the image display unit 21R, and the correction unit 90L performs the correction.

In other words, the CPU 53 sets, at step S15, the amount of correction of position gaps in the XY directions calculated by the process of step S14 or the amount of correction of scale gap to be the amount of correction of position gaps in the XY directions or the amount of correction of scale gap for the left eye, or to put it another way, the amount of correction for correcting the display gap of the image displayed on the image display unit 21L and presented to the user's left eye.

At step S16, the CPU 53 determines whether or not to terminate the processing.

When, for example, after having performed an operation for correcting the scale gap of the left eye, the user subsequently performs a negative determination operation or an audio response against the termination confirmation message at the determination timing of step S16, the processing is determined not to be terminated.

Alternatively, when, for example, after having performed an operation for correcting the scale gap of the left eye and gaps in the XY directions, the user has not performed any operation for a certain time, the processing is determined to be terminated.

When, it is determined at step S16 that the processing is not to be terminated, the process flow returns to step S14 and the aforementioned processing is repeatedly performed.

When, on the contrary, it is determined at step S16 that the processing is to be terminated, the process flow proceeds to step S17.

At step S17, the CPU 53 calculates the amount of correction for the left and right eyeballs on the basis of the amount of correction of display gaps of the left and right eyes calculated in the aforementioned processing.

Specifically, the CPU 53 corrects the reference display position and size defined according to a predetermined reference amount of parallax of the left and right eyes, by the amount of correction of gaps in the XY directions and the amount of correction of scale gap respectively calculated for the left and right eyes in the aforementioned processing, so as to acquire the amount of eyeball correction for each of the left and right eyes. In other words, the amount of correction of gaps in the XY directions is added to the reference display position, whereby the reference size is enlarged or reduced by the amount of correction of scale gap.

The amount of eyeball correction is used to correct the gaps between the installation position and the focal length of the imaging unit 22, and the actual viewpoint position and the focal length of the user.

When the amount of eyeball correction is calculated, the adjustment processing is subsequently terminated.

As has been described above, the display apparatus 11 extracts the region of the user's hand from an input image to generate an adjustment image, and calculates the amount of correction of display gap from the adjustment image at each time according to the user's operation. Accordingly, the gaps between the position and size of an object being recognized by the display apparatus 11, and the position and size of the object in the augmented reality space being viewed by the user are appropriately corrected, and therefore it is possible to improve the operability of the display apparatus 11.

Although, an example has been explained here in which the calculation of the amount of correction for the right eye and the calculation of the amount of correction for the left eye are performed in succession, the calculations may be performed simultaneously in parallel, or may be performed independently and separately.

<Outline of Touch Recognition Processing>

When the amount of correction of display gap is calculated as described above, it becomes possible for the display apparatus 11 to display a virtual image whose display gap has been appropriately corrected, and perform processing in accordance with the user's operation. In the following, with reference to FIG. 10, there will be explained a flow of the processing performed by the display apparatus 11 when the user performs operation on the virtual image.

Figure 10:
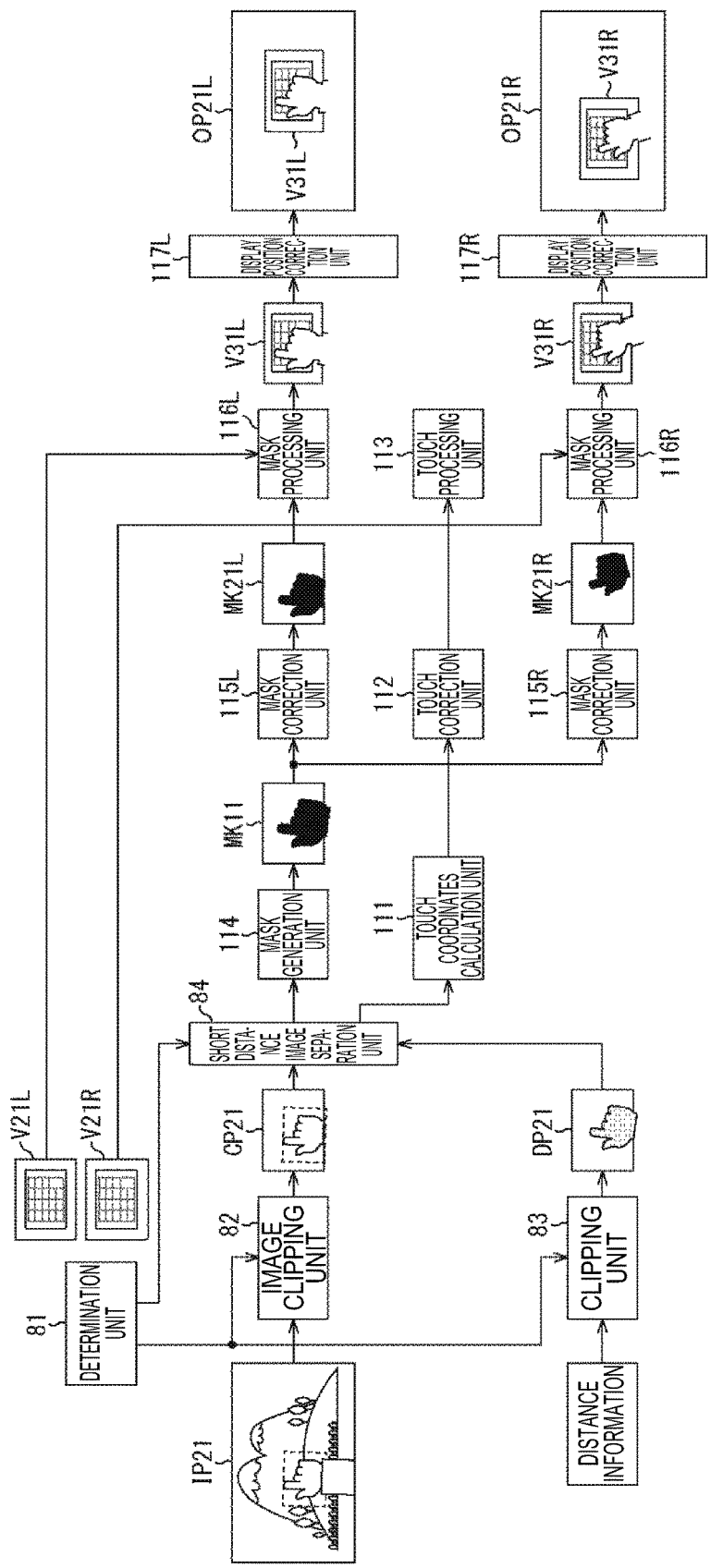
FIG. 10 is a diagram explaining display of an output image.

Note that, in FIG. 10, the same sign is attached to a part corresponding to a part in FIG. 7 and the explanation thereof will be omitted appropriately.

In the example of FIG. 10, the determination unit 81, the image clipping unit 82, the clipping unit 83, the short distance image separation unit 84, a touch coordinates calculation unit 111, a touch correction unit 112, a touch processing unit 113, a mask generation unit 114, a mask correction unit 115L, a mask processing unit 116L, a display position correction unit 117L, a mask correction unit 115R, a mask processing unit 116R, and a display position correction unit 117R are implemented, for example, by the CPU 53 executing a program stored in the ROM 54.

Additionally, in the following, when the mask correction unit 115L and the mask correction unit 115R do not have to be distinguished in particular, each of them will be also simply called a mask correction unit 115. Furthermore, in the following, when the display position correction unit 117L and the display position correction unit 117R do not have to be distinguished in particular, each of them will be also simply called a display position correction unit 117.

In the example of FIG. 10, the determination unit 81 determines a virtual image V21L to be presented to the user's left eye by being displayed on the image display unit 21L and a virtual image V21R to be presented to the user's right eye by being displayed on the image display unit 21R. In the following, when the virtual image V21L and the virtual image V21R do not have to be distinguished in particular, each of them will be also simply called a virtual image V21.

The determination unit 81 determines the display position, size, and distance of the virtual image V21R.

Here, the display position and size of the virtual image V21 are a position and size on the output image. Further, the distance of the virtual image V21 to be displayed is a distance from the imaging unit 22 to the virtual image V21 in the real space, or more specifically, the three-dimensional augmented reality space.

The determination unit 81 supplies the display position and size of the determined virtual image V21 to the image clipping unit 82 and the clipping unit 83, and also supplies the distance of the determined virtual image V21 to the short distance image separation unit 84.

In addition, the determination unit 81 supplies the determined virtual image V21L to the mask processing unit 116L, and also supplies the determined virtual image V21R to the mask processing unit 116R.

The image clipping unit 82 clips, as a clipped image CP21, a region in an input image IP21 defined by the display position and size of the virtual image V21 supplied from the determination unit 81, and supplies the clipped image CP21 to the short distance image separation unit 84.

The image clipping unit 82 clips a region in the vicinity of the virtual image V21 as the clipped image CP21, and therefore the clipped image CP21 turns out to be an image including the user's hand in a case where, for example, the user is performing an operation on the virtual image V21.

In addition, the clipping unit 83 clips, as a distance image DP21, a region defined by the display position and size of the virtual image V21 supplied from the determination unit 81 in the distance information, and supplies the distance image DP21 to the short distance image separation unit 84. Here, cutting out of the distance image DP21 is performed so that the distance image DP21 becomes information indicating the distance to the object in each region of the clipped image CP21.

The short distance image separation unit 84 extracts, as a short distance image, a region of an object located closer to the imaging unit 22 than the virtual image V21 in the clipped image CP21 on the basis of the distance supplied from the determination unit 81 and the distance image DP21 supplied from the clipping unit 83. Accordingly, the region of the user's hand operating the virtual image V21 is extracted as the short distance image.

In addition, the short distance image separation unit 84 supplies the short distance image to the mask generation unit 114, and also supplies the distance image DP21 to the touch coordinates calculation unit 111.

The touch coordinates calculation unit 111 calculates, and supplies to the touch correction unit 112, the coordinates of the user's touch position on the virtual image V21 on the basis of the distance image DP21 supplied from the short distance image separation unit 84.

The touch correction unit 112 corrects the position and size of the touch coordinates supplied from the touch coordinates calculation unit 111 on the basis of the amount of correction of position gaps in the XY directions and the amount of correction of scale gap for each of the left and right eyes acquired by the adjustment processing explained with reference to FIG. 8, and supplies the corrected touch coordinates to the touch processing unit 113.

The touch processing unit 113 causes each part of the display apparatus 11 to perform processing in accordance with the coordinates of the touch position supplied from the touch correction unit 112.

The mask generation unit 114 masks, as a masked image MK11, the short distance image supplied from the short distance image separation unit 84, and supplies the masked image MK11 to the mask correction unit 115L and the mask correction unit 115R. Here, the masked image MK11 is an image indicating the region of the user's hand in the short distance image, i.e., the region of a short distance object located closer to the imaging unit 22 than the virtual image V21.

In the following, the region of the user's hand in the masked image MK11, more specifically, the region of the object located closer to the imaging unit 22 than the virtual image V21 will be called an unmasked region which is a region that has not been masked.

The mask correction unit 115L corrects the position and size of the unmasked region in the masked image MK11 supplied from the mask generation unit 114 on the basis of the amount of correction of position gaps in the XY directions and the amount of correction of scale gap for the left eye acquired by the adjustment processing explained with reference to FIG. 8. In other words, the unmasked region is moved by the amount of correction of position gap, and the unmasked region is enlarged or reduced by the amount of correction of scale gap.

The mask correction unit 115L supplies a masked image MK21L acquired by correction of the masked image MK11 to the mask processing unit 116L.

The mask processing unit 116L corrects the position and size of the virtual image V21L supplied from the determination unit 81 on the basis of the amount of correction of position gaps in the XY directions and the amount of correction of scale gap for the left eye acquired by the adjustment processing explained with reference to FIG. 8.

In addition, the mask processing unit 116L removes, from the virtual image V21L whose position and size have been corrected, the part of the unmasked region of the masked image MK21L supplied from the mask correction unit 115L, and supplies a resultant virtual image V31L to the display position correction unit 117L.

The virtual image V31L acquired in the above manner turns out to be an image from which the region of the user's hand has been removed from the virtual image V21L. In other words, the virtual image V31L is an image acquired by performing transparent processing on the region of the part of the user's hand in the virtual image V21L.

The display position correction unit 117L generates an output image OP21L on the basis of the virtual image V31L supplied from the mask processing unit 116L, and the amount of eyeball correction of the left eye acquired by the adjustment processing explained with reference to FIG. 8. The output image OP21L turns out to be an image having the virtual image V31L displayed at a display position as the amount of eyeball correction of the left eye in the image, with a size as the amount of eyeball correction of the left eye.

The display position correction unit 117L supplies the output image OP21L acquired in the above manner to the image display unit 21L for display.

The mask correction unit 115R corrects the position and size of the unmasked region in the masked image MK11 supplied from the mask generation unit 114 on the basis of the amount of correction of position gaps in the XY directions and the amount of correction of scale gap for the right eye acquired by the adjustment processing explained with reference to FIG. 8.

The mask correction unit 115R supplies a masked image MK21R acquired by correction of the masked image MK11 to the mask processing unit 116R.

The mask processing unit 116R corrects the position and size of the virtual image V21R supplied from the determination unit 81 on the basis of the amount of correction of position gaps in the XY directions and the amount of correction of scale gap for the right eye acquired by the adjustment processing explained with reference to FIG. 8.

In addition, the mask processing unit 116R removes, from the virtual image V21R whose position and size have been corrected, the part of the unmasked region of the masked image MK21R supplied from the mask correction unit 115R, and supplies a resultant virtual image V31R to the display position correction unit 117R.

The display position correction unit 117R generates an output image OP21R on the basis of the virtual image V31R supplied from the mask processing unit 116R and the amount of eyeball correction for the right eye acquired by the adjustment processing explained with reference to FIG. 8. The display position correction unit 117R supplies the output image OP21R acquired in the above manner to the image display unit 21R for display.

<Explanation of Touch Recognition Processing>

Figure 11:
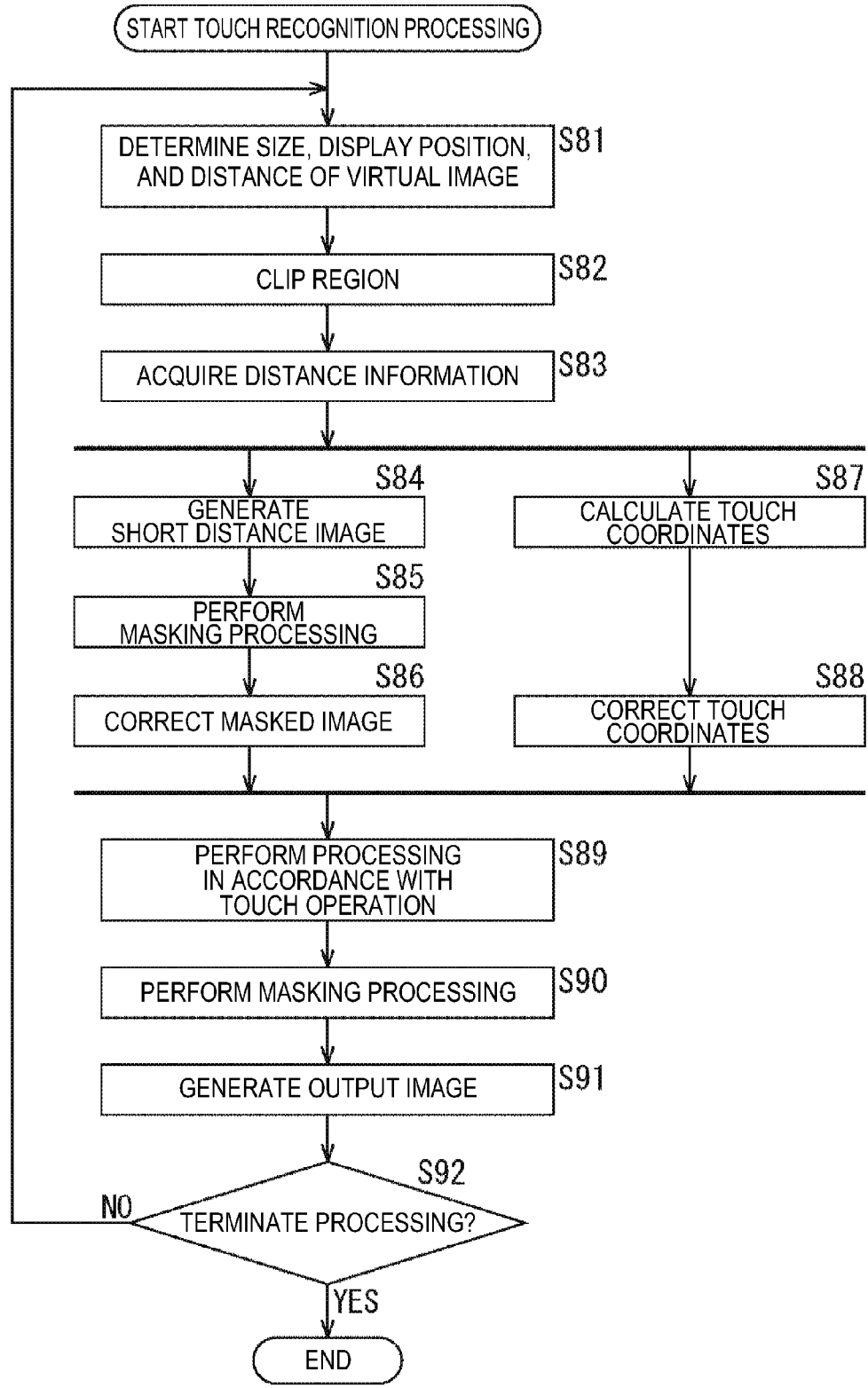
FIG. 11 is a flowchart explaining touch recognition processing.

Next, with reference to the flowchart of FIG. 11, there will be explained touch recognition processing in which the display apparatus 11 displays the output image, and also recognizes a user's operation for the virtual image to perform processing according to the operation.

At step S81, the determination unit 81 determines a virtual image, and the size, display position and distance of the virtual image.

The determination unit 81 supplies the display position and size of the determined virtual image to the image clipping unit 82 and the clipping unit 83, and supplies the distance of the determined virtual image to the short distance image separation unit 84. In addition, the determination unit 81 supplies the determined virtual image for the left eye to the mask processing unit 116L, and also supplies the determined virtual image for the right eye to the mask processing unit 116R.

At step S82, the image clipping unit 82 clips, from an input image supplied from the imaging unit 22 via the camera input unit 51 and the camera processing unit 52, a region defined by the display position and size of the virtual image supplied from the determination unit 81. The image clipping unit 82 supplies the image of the region clipped from the input image to the short distance image separation unit 84 as a clipped image.

At step S83, the display apparatus 11 acquires distance information corresponding to the clipped image region.

In other words, the CPU 53 supplies, to the short distance image separation unit 84, the image clipped by the image clipping unit 82 and the clipping unit 83 and the distance information from the image acquired by the imaging unit 22 and distance information on the basis of a region defined by the display position and size of the virtual image supplied from the determination unit 81.

When the process of step S83 is performed, the process from step S84 to step S86, and the process from step S87 to step S88 are subsequently performed in parallel.

At step S84, the short distance image separation unit 84 generates, and supplies to the mask generation unit 114, a short distance image by extracting the short distance object from the clipped image supplied from the image clipping unit 82 on the basis of the distance supplied from the determination unit 81. In addition, the short distance image separation unit 84 supplies the distance image to the touch coordinates calculation unit 111.

For example, the short distance image separation unit 84 generates a short distance image by detecting in the distance image a pixel whose pixel value indicating the distance of the object is larger than the value indicating the distance supplied from the determination unit 81, and setting the pixel values of the pixels of the clipped image with the same positional relation as the detected pixel to be zero. The short distance image acquired in this manner turns out to be an object located closer to the imaging unit 22 than the virtual image, i.e., an image including only the region of the short distance object.

At step S85, the mask generation unit 114 performs masking processing on the short distance image supplied from the short distance image separation unit 84, and supplies the resultant masked image to the mask correction unit 115L and the mask correction unit 115R.

For example, the mask generation unit 114 generates a masked image with the object at a short distance, i.e., the region of the user's hand, being an unmasked region, by setting a new pixel value of one to a pixel in the short distance image having a pixel value of zero, and setting a new pixel value of zero to a pixel in the short distance image having a pixel value other than zero. In the masked image, a region of pixels having a value of zero turns out to be the unmasked region.

At step S86, the mask correction unit 115 corrects, and supplies to the mask processing unit 116, the masked image supplied from the mask generation unit 114 on the basis of the amount of correction of position gaps in the XY directions acquired by the adjustment processing and the amount of correction of scale gap.

For example, the mask correction unit 115L moves the position of the unmasked region in the masked image by the amount of correction of position gaps in the XY directions for the left eye, and also enlarges or reduces the unmasked region in the masked image by the amount of correction of scale gap for the left eye.

The mask correction unit 115R corrects the masked image similarly to the mask correction unit 115L on the basis of the amount of correction of position gaps in the XY directions for the right eye and the amount of correction of scale gap.

In addition, at step S87, the touch coordinates calculation unit 111 calculates, and supplies to the touch correction unit 112, the user's touch coordinates on the virtual image on the basis of the distance image supplied from the short distance image separation unit 84.

For example, the touch coordinates calculation unit 111 extracts, from respective regions in the distance image, a region in which the distance to the object indicated by the distance image matches the distance to the virtual image determined by the determination unit 81. The touch coordinates calculation unit 111 then defines a region of the front edge part of a single region including the respective extracted regions as the region of the touch position, and defines the median of the coordinates of respective positions in the region of touch position as the touch coordinates. In other words, the process extracts, from the respective regions in the clipped image, the region of the object at the position of the virtual image in the three-dimensional augmented reality space, and defines the position of the extracted region as the user's touch position.

More specifically, the information indicating a predetermined region including the touch coordinates is also supplied to the touch correction unit 112 as information of the touch position. In addition, the number of touch coordinates calculated (detected) by the touch coordinates calculation unit 111 may be one or more, depending on the user's touch operation.

At step S88, the touch correction unit 112 corrects the touch coordinates supplied from the touch coordinates calculation unit 111 on the basis of the amount of correction of position gaps in the XY directions and the amount of correction of scale gap acquired by the adjustment processing on each of the left and right eyes.

In other words, the touch correction unit 112 acquires the region of touch position and the touch coordinates for the left eye by moving the touch coordinates by the amount of correction of position gaps in the XY directions for the left eye, and enlarging or reducing the size of the region of touch position (touch coordinates) for the left eye. In addition, the touch correction unit 112 also performs a process similar to that for the left eye to acquire the region of touch position and the touch coordinates for the right eye.

The touch correction unit 112 supplies, to the touch processing unit 113, the touch coordinates and the region of touch position for the left and right eyes acquired in the above manner.

When the process from step S86 to step S88 is performed, the touch processing unit 113, at step S89, causes each part of the display apparatus 11 to perform a process in accordance with the user's touch operation on the basis of the touch coordinates or the like supplied from the touch correction unit 112.

In other words, the touch processing unit 113 determines on the basis of the touch coordinates or the like, whether or not a region of an operation target such as a button on the virtual image has been touched by the user. For example, the touch processing unit 113 determines whether or not an operation has been performed on any of the operation targets by defining the median of the touch coordinates of each of the left and right eyes as the position touched by the user, or defining the overlapping part of the regions of the touch position for each of the left and right eyes as the region touched by the user.

It is also conceivable to calculate the last touch position by synthesizing the touch coordinates for the left and right eyes in a weighted manner, calculate the last touch position by using only the touch coordinates of one of the left and right eyes, or perform processing of determining a touch operation for each of the left and right eyes to acquire the final determination result from the determination result.

In accordance with the result of the processing of determining whether or not a touch operation has been performed as described above, the touch processing unit 113 causes each part of the display apparatus 11 to perform processing in accordance with the touch operation.

For example, the processing according to the touch operation is image display, sound reproduction, or the like. Specifically, the touch processing unit 113 causes a display color to be changed such as causing a region of the virtual image touched by the user to become bright or causes sound specified by the touch operation to be reproduced. Further, the output image may be displayed by a flush or the color of the virtual image is changed.

At step S90, the mask processing unit 116 performs masking processing on the virtual image supplied from the determination unit 81 using the masked image supplied from the mask correction unit 115, and supplies the masked virtual image to the display position correction unit 117.

Specifically, the mask processing unit 116L corrects, for example, the position and size of the virtual image for the left eye on the basis of the amount of correction of position gaps in the XY directions and the amount of correction of scale gap for the left eye acquired by the adjustment processing. The mask processing unit 116L then multiplies the pixel values of respective pixels of the corrected virtual image by the pixel values of pixels of the masked image being in the same positional relation as the former pixels, and defines the resultant image as the masked virtual image.

Accordingly, an image having the unmasked region indicated by the masked image, i.e., the part of the region of the user's hand, removed from the original virtual image is acquired as the masked virtual image.

The mask processing unit 116R performs a process similar to that performed by the mask processing unit 116L to generate a masked virtual image for the right eye.

At step S91, the display position correction unit 117 generates an output image on the basis of the virtual image supplied from the mask processing unit 116 and the amount of eyeball correction acquired by the adjustment processing.

The display position correction unit 117L, for example, generates, and supplies to the image display unit 21L, an output image in which a virtual image is displayed at a display position defined by the amount of eyeball correction for the left eye with a size determined by the amount of eyeball correction for the left eye. In addition, the display position correction unit 117R also performs a process similar to that performed by the display position correction unit 117L to generate, and supply to the image display unit 21R, an output image.

The image display unit 21L and the image display unit 21R display output images supplied from the display position correction unit 117L and the display position correction unit 117R.

Accordingly, it turns out that a virtual image is displayed on the image display unit 21. In addition, nothing will be displayed on the part overlapping with the user's actual hand in the virtual image. In other words, the user's hand and the virtual image do not overlap when viewed from the user, and therefore it is possible to present an easier-to-view virtual image to the user.

At step S92, the CPU 53 determines whether or not to terminate the processing. For example, when the user instructs termination of the operation on the virtual image, it is determined that the processing is to be terminated.

When, it is determined at step S92 that the processing is not to be terminated, the process flow returns to step S81 and the aforementioned processing is repeatedly performed.

When, on the contrary, it is determined at step S92 that the processing is to be terminated, the touch processing is terminated.

As has been described above, the display apparatus 11 corrects the display position and size of the virtual image or the like on the basis of the amount of correction acquired as a result of the adjustment processing, and also detects a touch operation performed by the user and performs processing in accordance with the touch operation.

By causing the virtual image to be displayed at an optional position and recognizing the touch operation for the virtual image based on the distance to the object in each region of the clipped image in this manner, it is possible to improve the operability of the display apparatus 11.

That is, since the disposition position of the virtual image is not restricted, a user interface having a higher freedom degree can be realized by the display apparatus 11. Further, by extracting an object region having the same distance as the distance to the virtual image and recognizing the touch operation, it is possible to perform the operation on the virtual image using an optional one, not limited to a hand or a foot, to improve the operability.

Furthermore, the display apparatus 11 corrects the display position, size, touch coordinates and the like of the virtual image using a preliminarily calculated amount of correction, whereby the gap between the position and size of an object recognized by the display apparatus 11 and the position and size of the object in the augmented reality space being viewed by the user is appropriately corrected. Accordingly, it is possible to improve the operability of the display apparatus 11.

In particular, in the display apparatus 11, since the processing is performed for the left and right images, that is, for the sake of two eyes, it is easy for the user to have a feeling of the distance to the virtual image displayed in the augmented reality space and not to feel stress in the operation for the virtual image.

<Exemplary Variation 1 of the First Embodiment>
<Exemplary Configuration of the Display Apparatus>

Figure 12:
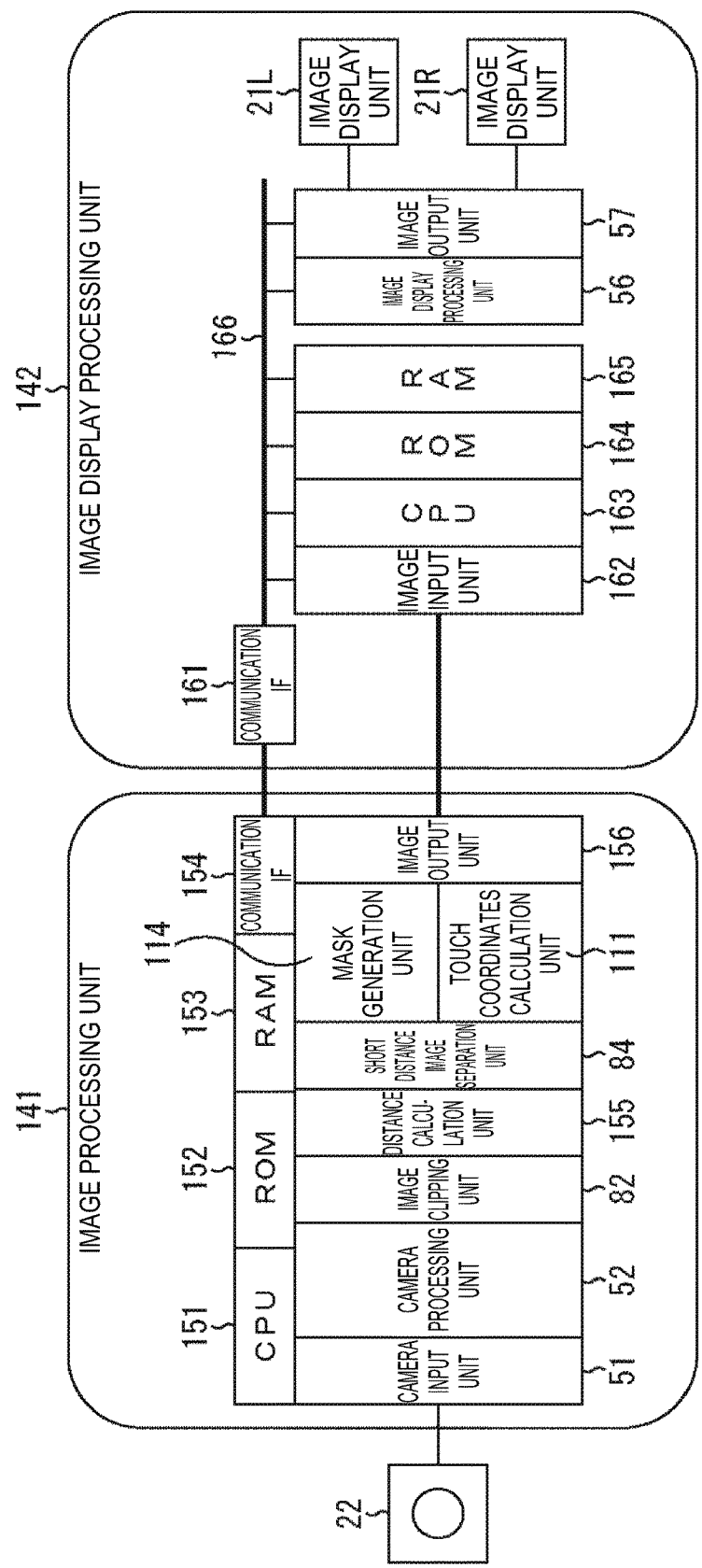
FIG. 12 is a diagram illustrating an exemplary configuration of a display apparatus.

In addition, although an example has been explained above in which the display apparatus 11 has the configuration as illustrated in FIG. 3, the display apparatus 11 may have a configuration as illustrated in FIG. 12. Note that, in FIG. 12, the same sign is attached to a part corresponding to a part in FIG. 3 or 10 and the explanation thereof will be omitted appropriately.

The display apparatus 11 illustrated in FIG. 12 includes the imaging unit 22, an image processing unit 141, and an image display processing unit 142.

In the present example, the image processing unit 141 and the image display processing unit 142 are interconnected, and the display apparatus 11 is implemented by the processing unit and a program.

The image processing unit 141 has a CPU 151, a ROM 152, a RAM 153, a communication IF (Interface) 154, the camera input unit 51, the camera processing unit 52, the image clipping unit 82, a distance calculation unit 155, the short distance image separation unit 84, the mask generation unit 114, the touch coordinates calculation unit 111, and an image output unit 156.

The CPU 151 controls the overall processing performed by the image processing unit 141.

For example, the CPU 151 implements the determination unit 81 by executing a program stored in the ROM 152, and exchanges various control information or the like with the image display processing unit 142 via the communication IF 154. In addition, the CPU 151 implements the contour extraction unit 85, and components ranging from the adjustment operation determination unit 87 to the scale calculation unit 89 in adjustment processing, for example.

The ROM 152 stores various images such as virtual images, data, programs and the like. The RAM 153 temporarily stores images, various data, programs, and the like. In addition, the RAM 153 functions as the reference image holding unit 86 in execution of adjustment processing.

The communication IF 154 communicates with the image display processing unit 142 to transmit and receive various control information or the like according to the control performed by the CPU 151.

The image clipping unit 82 generates, and supplies to the short distance image separation unit 84, a clipped image from the input image supplied from the imaging unit 22 via the camera input unit 51 and the camera processing unit 52. The distance calculation unit 155, which corresponds to the clipping unit 83, calculates distance information on the basis of information supplied from the imaging unit 22 for acquiring the distance to the object, and also generates a distance image from the distance information and supplies the distance image to the short distance image separation unit 84.

The short distance image separation unit 84 generates, and supplies to the mask generation unit 114, a short distance image, on the basis of the clipped image from the image clipping unit 82 and the distance image from the distance calculation unit 155, and also supplies the distance image to the touch coordinates calculation unit 111.

The mask generation unit 114 generates a masked image from the short distance image acquired from the short distance image separation unit 84, and supplies the masked image to the image display processing unit 142 via the image output unit 156. The touch coordinates calculation unit 111 calculates touch coordinates from the distance image acquired from the short distance image separation unit 84, and supplies the touch coordinates to the image display processing unit 142 via the communication IF 154. The touch coordinates may be supplied, in association with the masked image, to the image display processing unit 142 by the image output unit 156.

The image output unit 156 communicates with the image display processing unit 142 to supply the masked image acquired from the mask generation unit 114 to the image display processing unit 142. In addition, in execution of the adjustment processing, the image output unit 156 transmits the adjustment image acquired by the contour extraction unit 85 to the image display processing unit 142.

In addition, the image display processing unit 142 has the communication IF 161, an image input unit 162, a CPU 163, a ROM 164, a RAM 165, an image display processing unit 56, the image output unit 57, a bus 166, the image display unit 21L, and the image display unit 21R.

In the image display processing unit 142, the communication IF 161, the image input unit 162, the CPU 163, the ROM 164, the RAM 165, the image display processing unit 56, and the image output unit 57 are interconnected by the bus 166.

The communication IF 161 communicates with the communication IF 154 to transmit and receive various control information or the like. The image input unit 162 receives, and supplies to the CPU 163, various images such as masked images from the image output unit 156.

The CPU 163 controls the overall processing performed by the image display processing unit 142.

For example, the CPU 163 implements the touch correction unit 112, the touch processing unit 113, the mask correction unit 115, the mask processing unit 116, and the display position correction unit 117 by executing a program stored in the ROM 164. In addition, for example, the CPU 163 implements the correction unit 90 and the display image generation unit 91 by executing a program in execution of the adjustment processing.

The ROM 164 stores various images, data, programs, and the like. The RAM 165 temporarily stores images, various data, programs, and the like.

<Exemplary Variation 2 of the First Embodiment>
<Exemplary Configuration of the Display Apparatus>

Figure 13:
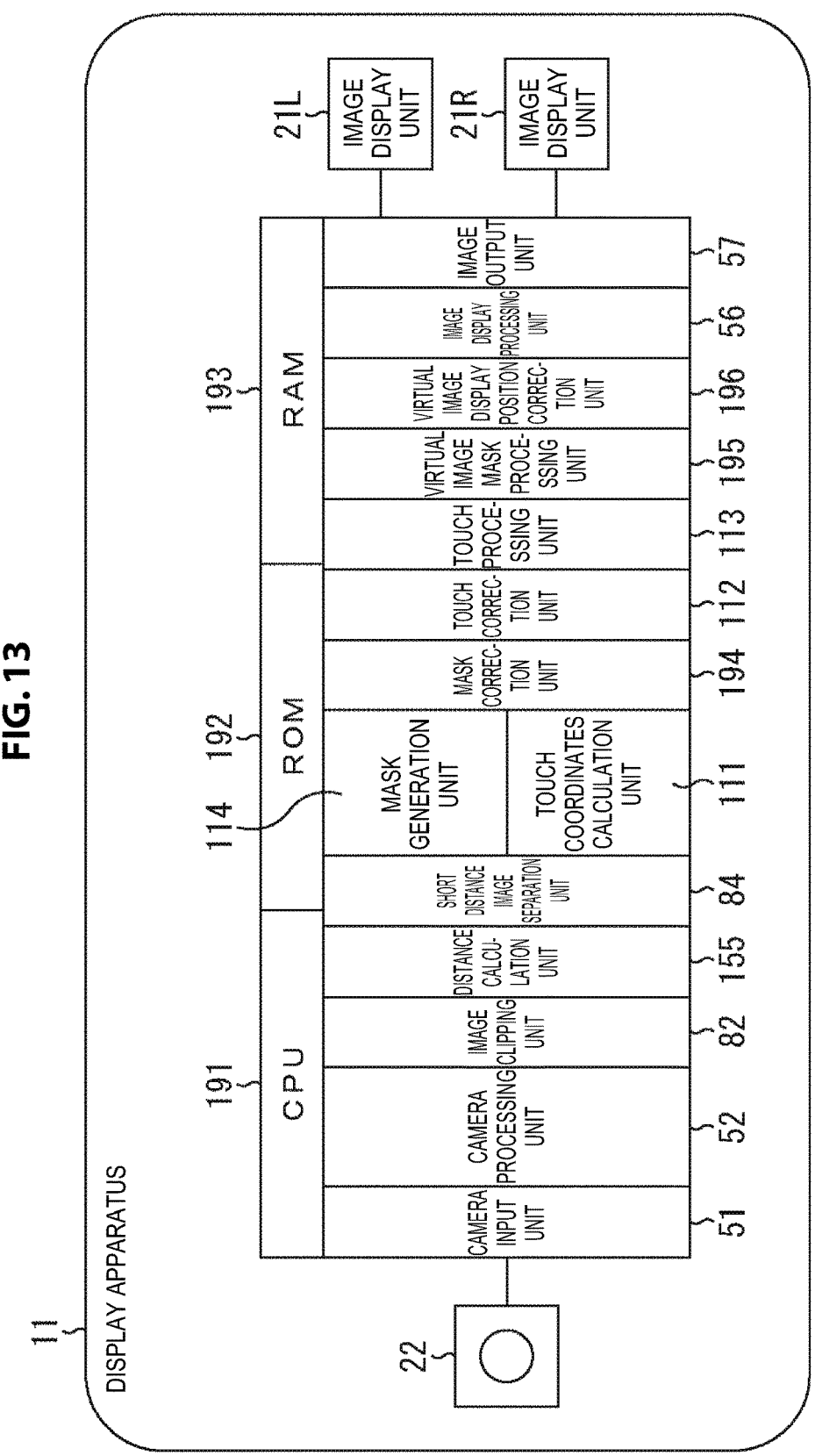
FIG. 13 is a diagram illustrating an exemplary configuration of a display apparatus.

Furthermore, the display apparatus 11 may have a configuration as illustrated in FIG. 13. Note that, in FIG. 13, the same sign is attached to a part corresponding to a part in FIG. 12 or 10 and the explanation thereof will be omitted appropriately.

The display apparatus 11 illustrated in FIG. 13 has the imaging unit 22, a CPU 191, a ROM 192, a RAM 193, the camera input unit 51, the camera processing unit 52, the image clipping unit 82, the distance calculation unit 155, the short distance image separation unit 84, the mask generation unit 114, the touch coordinates calculation unit 111, the mask correction unit 194, the touch correction unit 112, the touch processing unit 113, a virtual image mask processing unit 195, a virtual image display position correction unit 196, the image display processing unit 56, the image output unit 57, the image display unit 21L, and the image display unit 21R.

The CPU 191 controls the overall processing performed by the display apparatus 11. For example, the CPU 191 implements the contour extraction unit 85, and components ranging from the adjustment operation determination unit 87 to the display image generation unit 91 in execution of the adjustment processing.

The ROM 192 stores various images such as virtual images, data, programs, and the like. The RAM 193 temporarily stores images, various data, programs and the like. In addition, the RAM 193 functions as the reference image holding unit 86 in execution of the adjustment processing, for example.

The mask correction unit 194 functions as the mask correction unit 115L and the mask correction unit 115R illustrated in FIG. 10 to correct, and supply to the virtual image mask processing unit 195, the masked image supplied from the mask generation unit 114.

The touch correction unit 112 corrects, and supplies to the touch processing unit 113, the touch coordinates supplied from the touch coordinates calculation unit 111, and the touch processing unit 113 performs the touch processing on the basis of the touch coordinates supplied from the touch correction unit 112.

The virtual image mask processing unit 195 functions as the mask processing unit 116L and the mask processing unit 116R illustrated in FIG. 10 to perform masking processing on the virtual image on the basis of the masked image supplied from the mask correction unit 194, and supply the masked virtual image to the virtual image display position correction unit 196.

The virtual image display position correction unit 196 functions as the display position correction unit 117L and the display position correction unit 117R of FIG. 10 to generate, and supply to the image display processing unit 56, an output image for the left and right eyes on the basis of the virtual image supplied from the virtual image mask processing unit 195.

It is also conceivable to implement the correction unit 90 illustrated in FIG. 7 by the mask correction unit 194, and implement the display image generation unit 91 illustrated in FIG. 7 by the virtual image display position correction unit 196, in the adjustment processing.

<Second Embodiment>
<Exemplary Configuration of Appearance of the Display Apparatus>

In addition, although an example has been explained above in which a single imaging unit 22 is provided in the display apparatus 11, there may be provided imaging units respectively at the left and right sides of the display apparatus.

Figure 14:
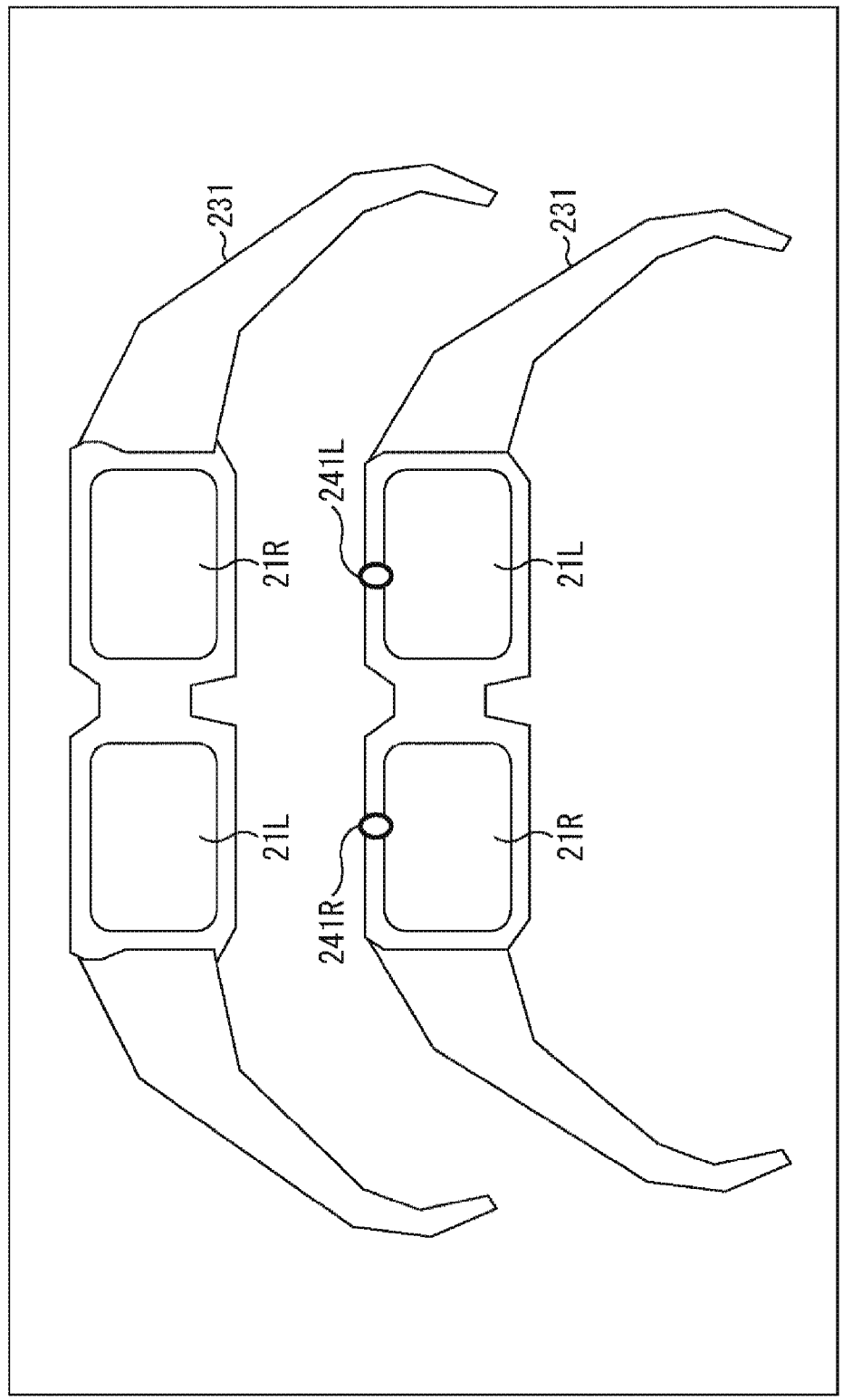
FIG. 14 is a diagram illustrating an exemplary configuration of an appearance of a display apparatus.

In such a case, for example, the appearance of the display apparatus is configured as illustrated in FIG. 14. Note that, in FIG. 14, the same sign is attached to a part corresponding to a part in FIG. 1 and the explanation thereof will be omitted appropriately.

For example, as illustrated in the upper part of FIG. 14, the image display unit 21L and the image display unit 21R are provided on the back side of a display apparatus 231.

In addition, an imaging unit 241L and an imaging unit 241R are respectively provided on the front side of the display apparatus 231 in the vicinity of the image display unit 21L and the image display unit 21R, as illustrated at the lower part of the drawing.

In other words, the imaging unit 241L, located at the upper part of the image display unit 21L in the drawing, captures an input image corresponding to the field of view seen by the user's left eye. In addition, the imaging unit 241R, located at the upper part of the image display unit 21R in the drawing, captures an input image corresponding to the field of view seen by the user's right eye. Note that, in the following, when the imaging unit 241L and the imaging unit 241R do not have to be distinguished in particular, each of them will be also simply called an imaging unit 241.

In addition, the position at which the imaging unit 241L and the imaging unit 241R are provided may be anywhere as long as the position is close to the image display unit 21L and the image display unit 21R, i.e., a position in the vicinity of the user's viewpoint.

Figure 15:
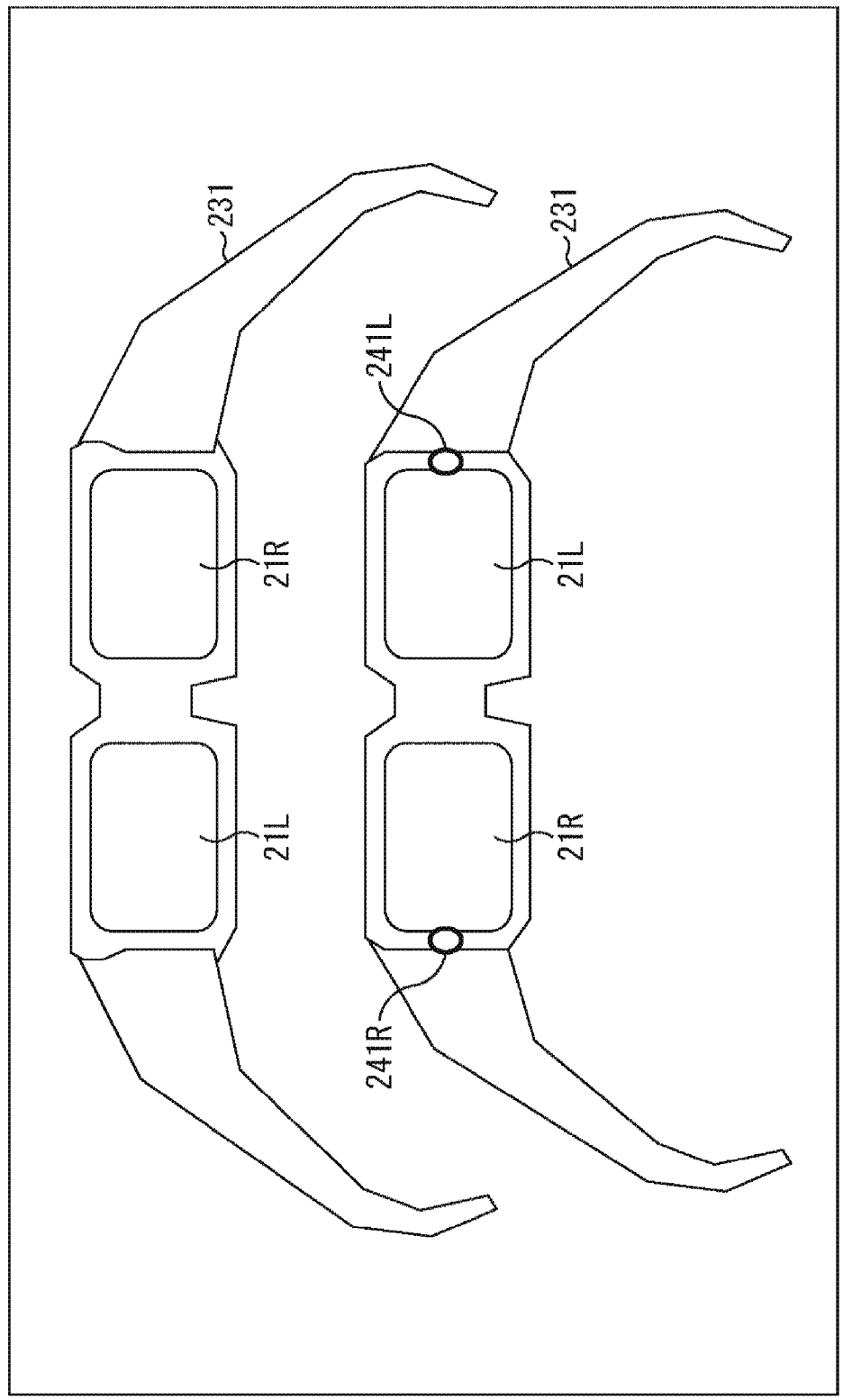
FIG. 15 is a diagram illustrating an exemplary configuration of an appearance of a display apparatus.

For example, as illustrated at the lower part of FIG. 15, the imaging unit 241L may be located at the right side of the image display unit 21L in the drawing, and the imaging unit 241R may be located at the left side of the image display unit 21R in the drawing.

Note that, in FIG. 15, the same sign is attached to a part corresponding to a part in FIG. 14 and the explanation thereof will be omitted appropriately. Additionally, in FIG. 15, there is illustrated the display apparatus 231 seen from the back side in the upper part of the drawing, and the display apparatus 231 seen from the front side in the lower part of the drawing.

<Exemplary Configuration of the Display Apparatus>

Figure 16:
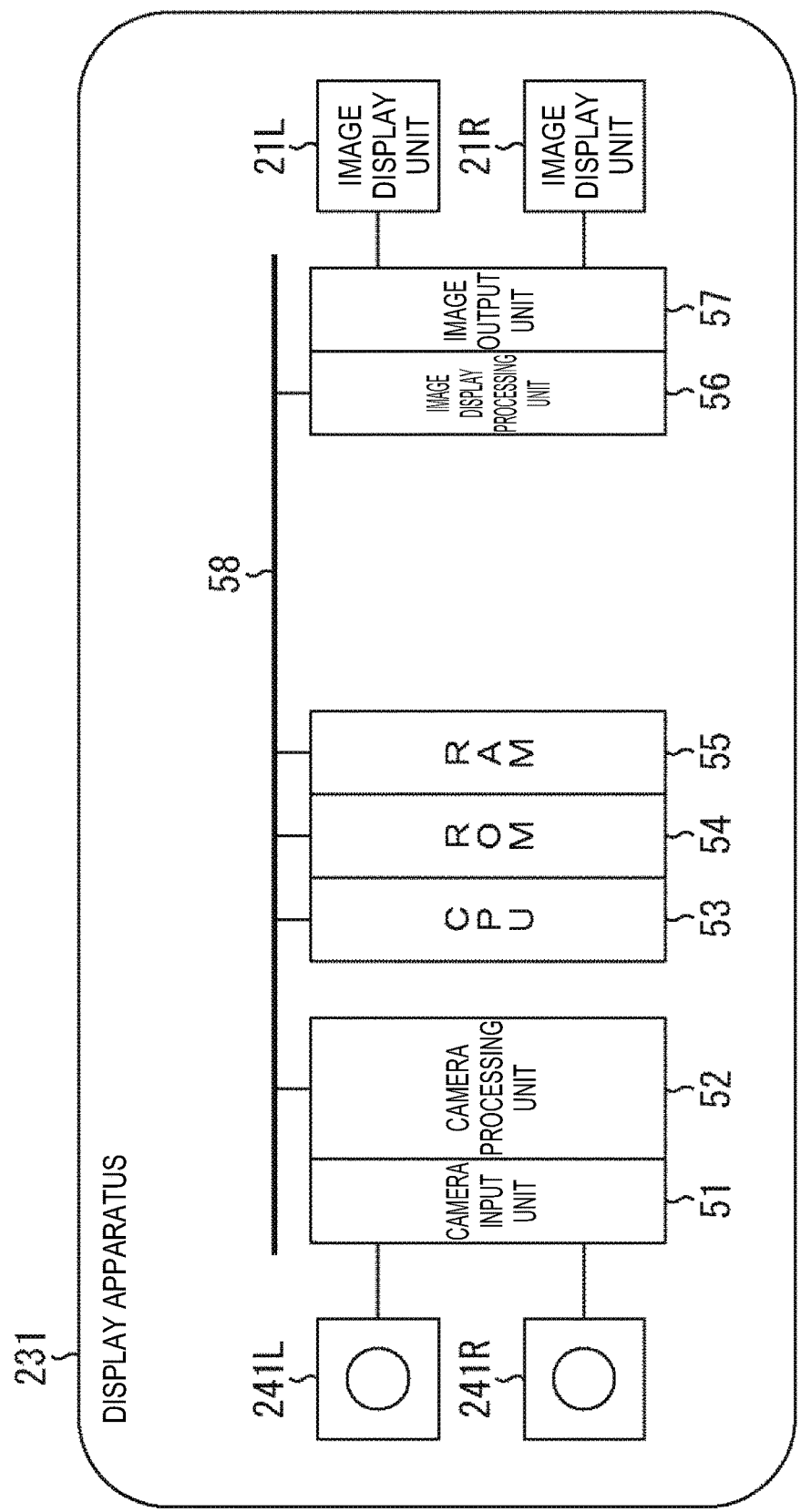
FIG. 16 is a diagram illustrating an exemplary configuration of a display apparatus.

Next, there will be explained a specific configuration of the display apparatus 231 shown in FIG. 14 or FIG. 15. FIG. 16 is a diagram illustrating an exemplary configuration of the display apparatus 231. Note that, in FIG. 16, the same sign is attached to a part corresponding to a part in FIG. 3 or FIG. 14, and the explanation thereof will be omitted appropriately.

The display device 231 includes the imaging unit 241L, the imaging unit 241R, the camera input unit 51, the camera processing unit 52, the CPU 53, the ROM 54, the RAM 55, the image display processing unit 56, the image output unit 57, the bus 58, the image display unit 21L, and the image display unit 21R.

The configuration of the display apparatus 231 is different from the configuration of the display apparatus 11 in that the imaging unit 241L and the imaging unit 241R are provided in place of the imaging unit 22 of the display apparatus 11, with the rest of the configuration being the same as the configuration of the display apparatus 11.

In the display apparatus 231, the CPU 53 performs processing using the input image acquired by the imaging unit 241L and the input image acquired by the imaging unit 241R.

<Outline of the Adjustment Processing>

Next, there will be explained the processing performed by the display apparatus 231.

To begin with, with reference to FIG. 17, there will be explained a adjustment processing flow performed by the display apparatus 231. Note that, in FIG. 17, the same sign is attached to a part corresponding to a part in FIG. 7 and the explanation thereof will be omitted appropriately.

Figure 17:
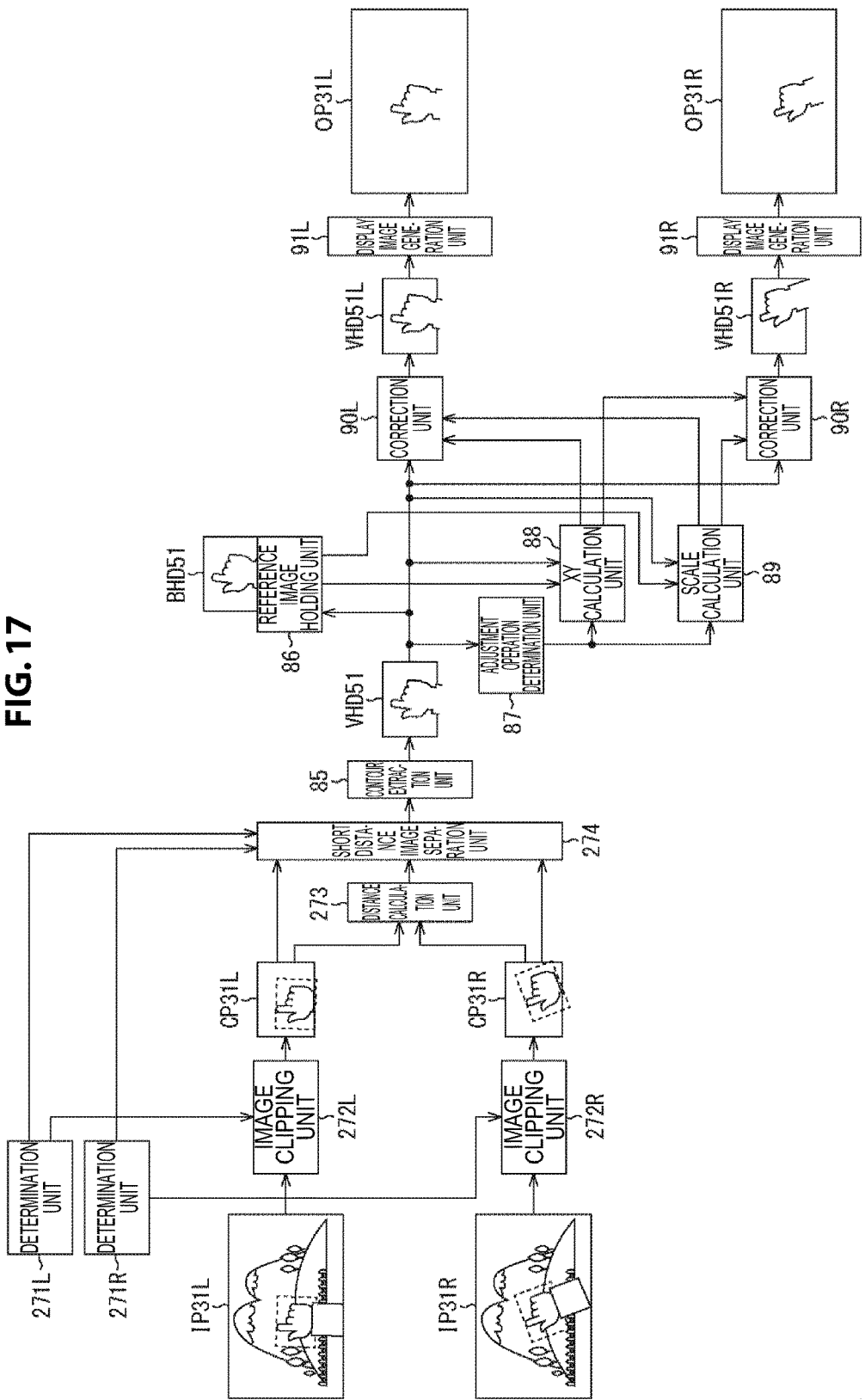
FIG. 17 is a diagram explaining display gap adjustment.

In the example of FIG. 17, a determination unit 271L, a determination unit 271R, an image clipping unit 272L, an image clipping unit 272R, a distance calculation unit 273, a short distance image separation unit 274, the contour extraction unit 85, the adjustment operation determination unit 87, the XY calculation unit 88, the scale calculation unit 89, the correction unit 90L, the correction unit 90R, the display image generation unit 91L, and the display image generation unit 91R are implemented, for example, by the CPU 53 executing a program stored in the ROM 54. In addition, for example, the reference image holding unit 86 is implemented by the RAM 55.

Note that, in the following, when the determination unit 271L and the determination unit 271R do not have to be distinguished in particular, each of them will be also simply called a determination unit 271. In addition, when the image clipping unit 272L and the image clipping unit 272R do not have to be distinguished in particular, each of them will be also simply called an image clipping unit 272.

In the display apparatus 231, the imaging unit 241L first captures, and supplies to the image clipping unit 272L, an input image IP31L for the left eye, and also the imaging unit 241R captures, and supplies to the image clipping unit 272R an input image IP31R for the right eye.

In addition, the determination unit 271L determines an adjustment size and position indicating the size and position of the region for the left eye in which the user's hand is to be detected in the adjustment processing, and a distance indicating the range in the depth direction for the left eye in which the user's hand is to be detected in the adjustment processing. The determination unit 271L then supplies the adjustment size and position to the image clipping unit 272L, and supplies the distance to the short distance image separation unit 274.

Similarly, the determination unit 271R determines an adjustment size and position indicating the size and position of the region for the right eye in which the user's hand is to be detected in the adjustment processing, and a distance indicating the range in the depth direction for the right eye in which the user's hand is to be detected in the adjustment processing. The determination unit 271R then supplies the adjustment size and position to the image clipping unit 272R, and supplies the distance to the short distance image separation unit 274.

The image clipping unit 272L clips, as a clipped image CP31L, a region in the input image IP31L defined by the adjustment size and position supplied from the determination unit 271L, and supplies the clipped image CP31L to the distance calculation unit 273 and the short distance image separation unit 274.

Similarly, the image clipping unit 272R clips, as a clipped image CP31R, a region in the input image IP31R defined by the adjustment size and position supplied from the determination unit 271R, and supplies the clipped image CP31R to the distance calculation unit 273 and the short distance image separation unit 274.

The distance calculation unit 273 calculates the parallax for each region of the clipped image by performing stereo matching or the like between the clipped image CP31L from the image clipping unit 272L and the clipped image CP31R from the image clipping unit 272R. The distance calculation unit 273 then defines the distance determined for the parallax calculated for each region as the distance to the object in each region in the clipped image, and supplies the distance image indicating the distance to the short distance image separation unit 274 as a result of calculation of the distance to the object.

The short distance image separation unit 274 generates, and supplies to the contour extraction unit 85, a short distance image by extracting, as the region of the user's hand, a region of a short distance object in the clipped image supplied from the image clipping unit 272 on the basis of the distance supplied from the determination unit 271 and the distance image supplied from the distance calculation unit 273.

For example, the short distance image separation unit 274 uses the distance determined by one of the determination unit 271L or the determination unit 271R, and uses one of the clipped image CP31L and the clipped image CP31R, also when adjusting a display gap for any of the user's left and right eyes.

When a short distance image is acquired in the above manner, components ranging from the contour extraction unit 85 to the display image generation unit 91 subsequently perform a process similar to that explained with reference to FIG. 7.

In other words, the contour extraction unit 85 generates, and supplies to components ranging from the adjustment operation determination unit 87 to the correction unit 90, an adjustment image VHD51 by performing contour extraction on the basis of the short distance image supplied from the short distance image separation unit 274. In addition, the adjustment image VHD51 acquired at the start of the adjustment processing is held in the reference image holding unit 86 as a reference image. In the present example, the adjustment image VHD51 acquired at the start of the adjustment processing is held in the reference image holding unit 86 as a reference image BHD51.

Furthermore, the adjustment operation determination unit 87 determines whether or not an operation for scale adjustment has been performed, and the XY calculation unit 88 or the scale calculation unit 89 calculates the amount of correction in accordance with the determination result.

In addition, the correction unit 90L and the correction unit 90R, respectively correct the adjustment image VHD51 into the adjustment image VHD51L and the adjustment image VHD51R. Furthermore, an output image OP31L and an output image OP31R are generated from the adjustment image VHD51L and the adjustment image VHD51R by the display image generation unit 91L and the display image generation unit 91R, and displayed on the image display unit 21.

<Explanation of Adjustment Processing>

Next, the adjustment processing explained with reference to FIG. 17 will be explained in more detail. In the following, with reference to the flowchart of FIG. 18, there will be explained the adjustment processing by the display apparatus 231.

At step S121, the display apparatus 231 performs amount-of-correction calculation processing to calculate the amount of correction of position gaps in the XY directions, or the amount of correction of scale gap for the right eye, i.e., the amount of correction in the output image to be displayed on the image display unit 21R.

Figure 19:
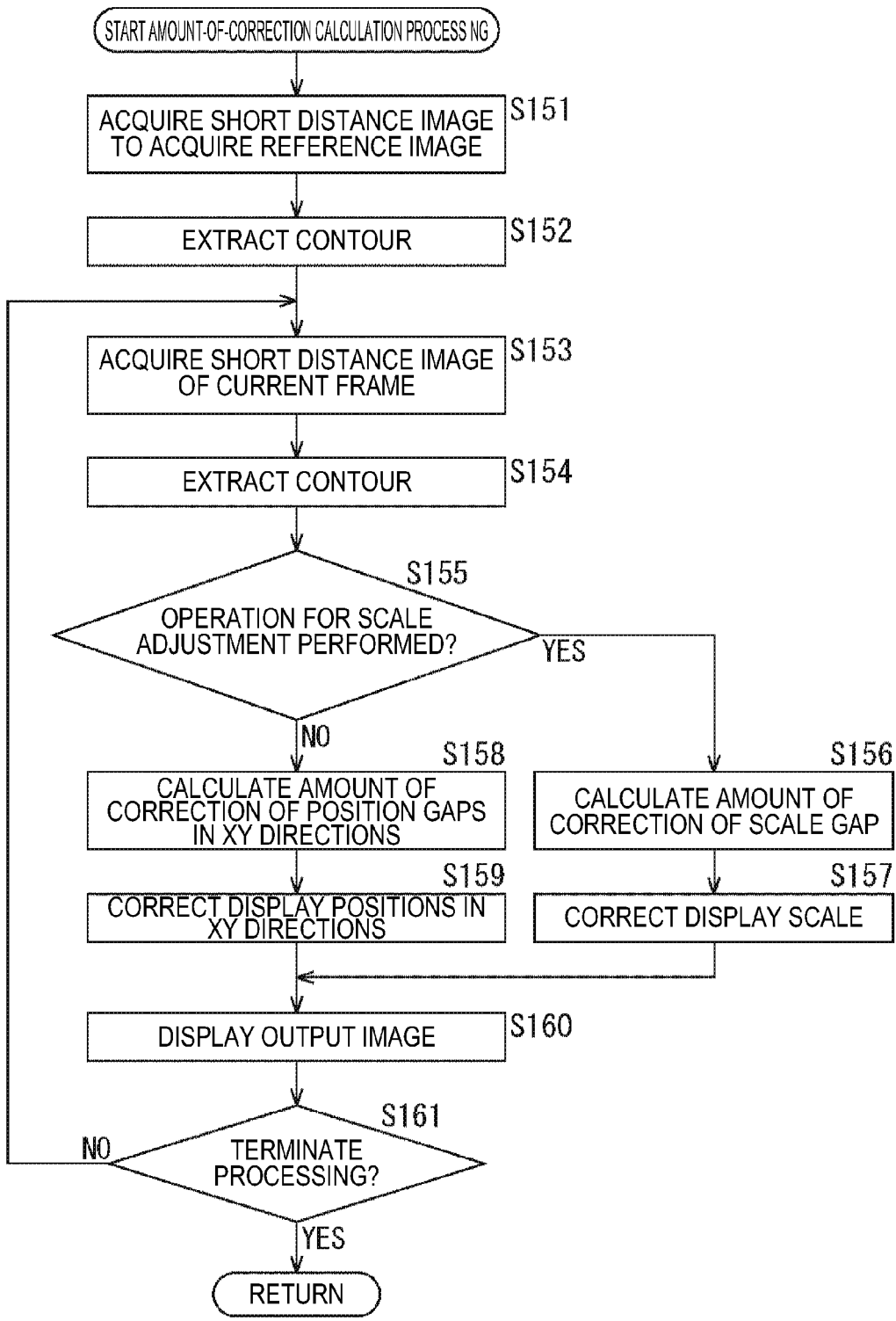
FIG. 19 is a flowchart explaining amount-of-correction calculation processing.

Here, with reference to the flowchart of FIG. 19, there will be explained the amount-of-correction calculation processing.

At step S151, the display apparatus 231 acquires a short distance image in order to acquire a reference image.

In other words, an imaging unit 241 captures an input image, and supplies it to the image clipping unit 272. The image clipping unit 272 clips, as a clipped image, a region in the input image defined by the adjustment size and position supplied from the determination unit 271, and supplies the clipped image to the distance calculation unit 273 and the short distance image separation unit 274.

The distance calculation unit 273 calculates the parallax for each region of the clipped image by performing stereo matching or the like on the basis of the clipped image supplied from each of the left and right image clipping units 272, and generates a distance image from the calculated parallax and supplies the distance image to the short distance image separation unit 274.

The short distance image separation unit 274 extracts, as a short distance image, the region of the user's hand in the clipped image supplied from the image clipping unit 272 on the basis of the distance supplied from the determination unit 271 and the distance image supplied from the distance calculation unit 273, and supplies the short distance image to the contour extraction unit 85. Specifically, the short distance image separation unit 274 extracts, as the region of the user's hand, a region in the clipped image in which the distance indicated by the distance image is shorter than the distance supplied from the determination unit 271.

When the short distance image is acquired in the above manner, the process from step S152 to step S161 is subsequently performed and the amount-of-correction calculation processing is terminated, about which explanation will be omitted because the process is similar to that from step S42 to step S51 of FIG. 9. However, at step S153, a short distance image is generated from the clipped image acquired by the image clipping unit 272 similarly to the case of step S151. In other words, a process similar to that of step S151 is performed at step S153.

When the amount-of-correction calculation processing is terminated, the process flow subsequently proceeds to step S122 of FIG. 18.

Figure 18:
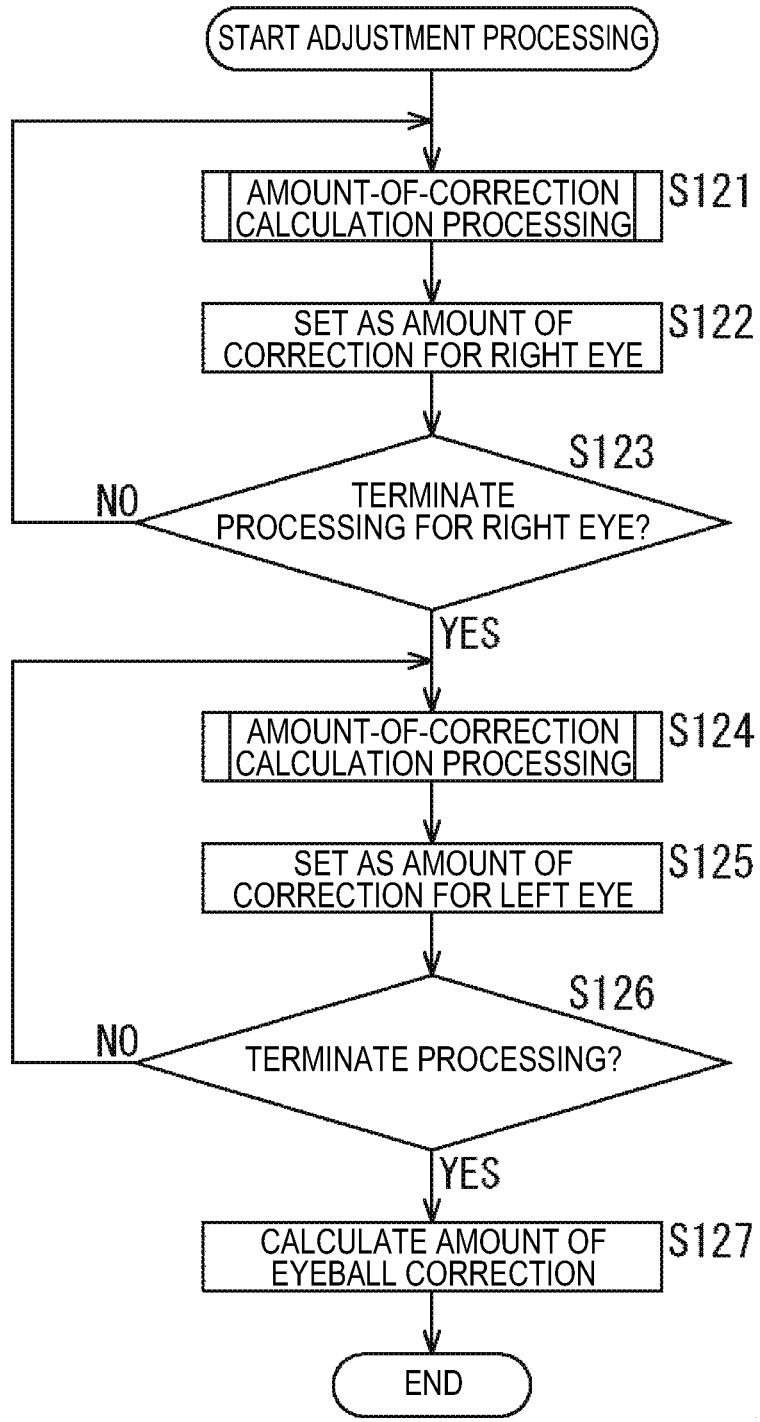
FIG. 18 is a flowchart explaining adjustment processing.

Returning to the explanation of the flowchart of FIG. 18, at step S122, the CPU 53 sets the amount of correction of position gaps in the XY directions or the amount of correction of scale gap calculated in the process of step S121 to be the amount of correction of position gaps in the XY directions for the right eye or the amount of correction of scale gap.

Subsequently, the process from step S123 to step S127 is performed and the adjustment processing is terminated, and the explanation thereof will be omitted since the processes are similar to those from step S13 to step S17 of FIG. 8. However, at step S124, processing similar to the amount-of-correction calculation processing explained with reference to FIG. 19 is performed.

As has been described above, the display apparatus 231 extracts the region of the user's hand from an input image to generate an adjustment image, and calculates the amount of correction of display gap from the adjustment image at each time according to the user's operation. Accordingly, the gaps between the position and size of an object being recognized by the display apparatus 231, and the position and size of the object in the augmented reality space being viewed by the user are appropriately corrected, and therefore it is possible to improve the operability of the display apparatus 231.

Although, an example has been explained here in which the calculation of the amount of correction for the right eye and the calculation of the amount of correction for the left eye are performed in succession, the calculations may be performed simultaneously in parallel.

<Outline of the Touch Recognition Processing>

Subsequently, with reference to FIG. 20, there will be explained the flow of touch recognition processing performed by the display apparatus 231.

Figure 20:
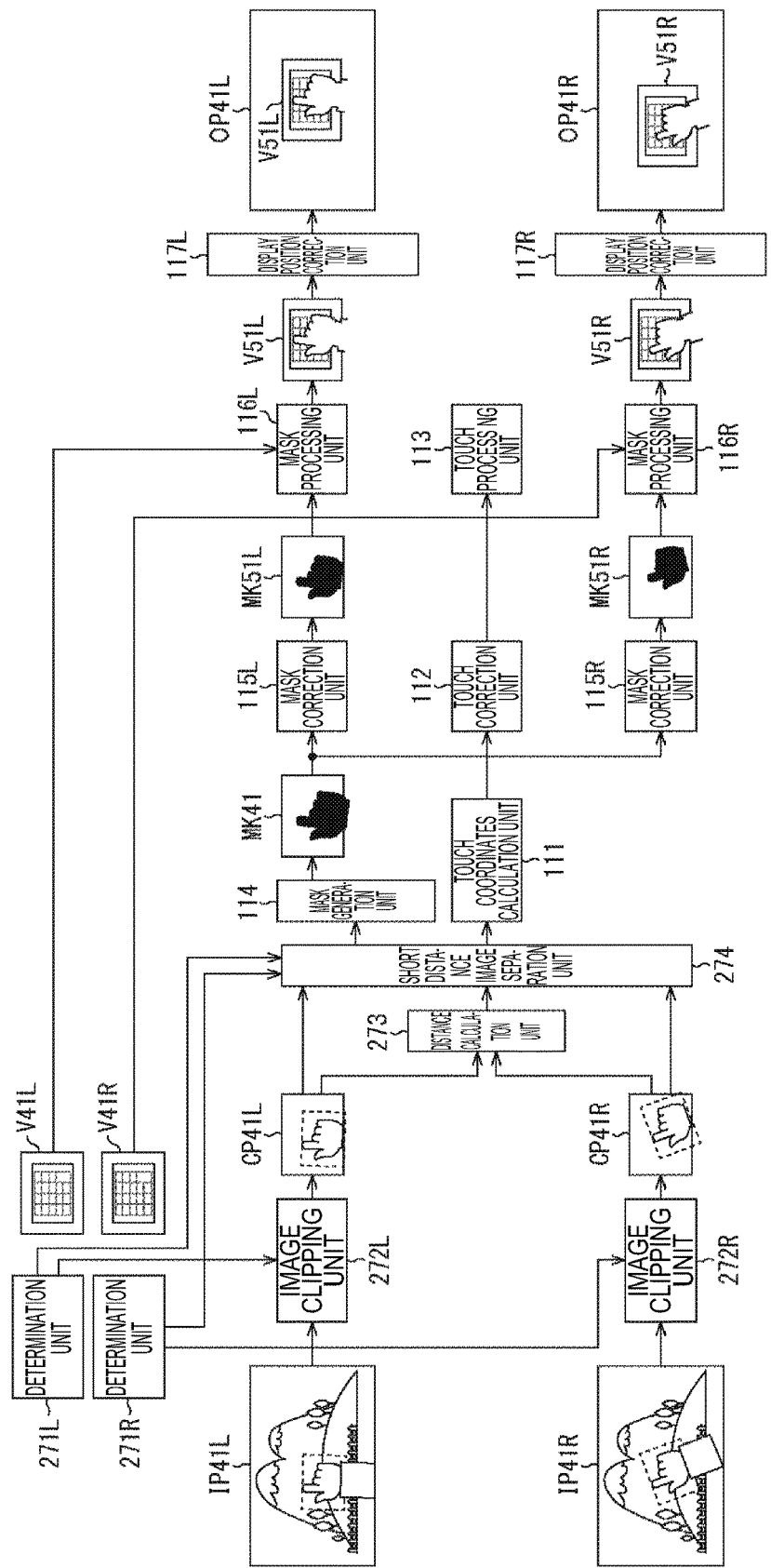
FIG. 20 is a diagram explaining display of an output image.

Note that, in FIG. 20, the same sign is attached to a part corresponding to a part in FIG. 10 or FIG. 17 and the explanation thereof will be omitted appropriately.

In the example of FIG. 20, the determination unit 271L and the determination unit 271R, the image clipping unit 272L and the image clipping unit 272R, the distance calculation unit 273, the short distance image separation unit 274, the touch coordinates calculation unit 111, the touch correction unit 112, the touch processing unit 113, the mask generation unit 114, the mask correction unit 115L, the mask processing unit 116L, the display position correction unit 117L, the mask correction unit 115R, the mask processing unit 116R, and the display position correction unit 117R are implemented, for example, by the CPU 53 executing a program stored in the ROM 54.

In the display apparatus 231, the determination unit 271L and the determination unit 271R first determine, and supply to the mask processing unit 116L and the mask processing unit 116R, a virtual image V41L to be displayed on the image display unit 21L and a virtual image V41R to be displayed on the image display unit 21R. Note that, in the following, when the virtual image V41L and the virtual image V41R do not have to be distinguished in particular, each of them will be also simply called a virtual image V41.

In addition, the determination unit 271L determines the display position, size and distance of the virtual image V41L, supplies the determined display position and size to the image clipping unit 272L, and supplies the determined distance to the short distance image separation unit 274.

Similarly, the determination unit 271R determines the display position, size and distance of the virtual image V41R, supplies the determined display position and size to the image clipping unit 272R, and supplies the determined distance to the short distance image separation unit 274.

The image clipping unit 272L clips, as a clipped image CP41L, a region in an input image IP41L defined by the display position and size supplied from the determination unit 271L, and supplies the clipped image CP41L to the distance calculation unit 273 and the short distance image separation unit 274. Similarly, the image clipping unit 272R clips, as clipped image CP41R, a region in an input image IP41R defined by the display position and size supplied by the determination unit 271R, and supplies the clipped image CP41R to the distance calculation unit 273 and the short distance image separation unit 274.

The distance calculation unit 273 generates a distance image by performing stereo matching or the like on the basis of the clipped image CP41L and the clipped image CP41R, and supplies the distance image to the short distance image separation unit 274.

The short distance image separation unit 274 generates a short distance image from the clipped image supplied from the image clipping unit 272 on the basis of the distance supplied from the determination unit 271 and the distance image supplied from the distance calculation unit 273, supplies the short distance image to the mask generation unit 114 and also supplies the distance image to the touch coordinates calculation unit 111.

In addition, the touch coordinates calculation unit 111 calculates coordinates of the user's touch position on the virtual image V41 on the basis of the distance image supplied from the short distance image separation unit 274, and supplies the coordinates to the touch correction unit 112. The touch correction unit 112 corrects, and supplies to the touch processing unit 113, the position and size of the touch coordinates from the touch coordinates calculation unit 111 on the basis of the amount of correction of position gaps in the XY directions for each of the left and right eyes and the amount of correction of scale gap acquired by the adjustment processing explained with reference to FIG. 18.

The touch processing unit 113 causes each part of the display apparatus 231 to perform processing in accordance with the coordinates of the touch position supplied from the touch correction unit 112.

The mask generation unit 114 masks, as a masked image MK41, the short distance image supplied from the short distance image separation unit 274, and supplies the masked image MK41 to the mask correction unit 115L and the mask correction unit 115R.

Although a masked image may be generated for each of the left and right eyes, the masked image is corrected by the mask correction unit 115 at a subsequent stage and thus, even when the same masked image is used for the left and right eyes, there appears almost no gap between the left and right output images in the region where the user's hand is to be removed. In addition, using the same masked image for the left and right eyes can reduce the amount of processing.

The mask correction unit 115L corrects the masked image MK41 on the basis of the amount of correction of position gaps in the XY directions and the amount of correction of scale gap for the left eye acquired by the adjustment processing explained with reference to FIG. 18, and supplies a resultant masked image MK51L to the mask processing unit 116L.

The mask processing unit 116L corrects the position and size of the virtual image V41L on the basis of the amount of correction of position gaps in the XY directions and the amount of correction of scale gap for the left eye acquired by the adjustment processing explained with reference to FIG. 18.

In addition, the mask processing unit 116L removes the part of the unmasked region of the masked image MK51L from the virtual image V41L whose position and size have been corrected, and supplies a resultant virtual image V51L to the display position correction unit 117L.

The display position correction unit 117L generates, and supplies to the image display unit 21L, an output image OP41L, on the basis of the virtual image V51L and the amount of eyeball correction for the left eye acquired by the adjustment processing explained with reference to FIG. 18.

The mask correction unit 115R corrects the masked image MK41 on the basis of the amount of correction of position gaps in the XY directions and the amount of correction of scale gap for the right eye acquired by the adjustment processing explained with reference to FIG. 18, and supplies a resultant masked image MK51R to the mask processing unit 116R.

The mask processing unit 116R corrects the position and size of the virtual image V41R on the basis of the amount of correction of position gaps in the XY directions and the amount of correction of scale gap for the right eye acquired by the adjustment processing explained with reference to FIG. 18.

In addition, the mask processing unit 116R removes the part of the unmasked region of the masked image MK51R from the virtual image V41R whose position and size have been corrected, and supplies a resultant virtual image V51R to the display position correction unit 117R.

The display position correction unit 117R generates, and supplies to the image display unit 21R, an output image OP41R, on the basis of the virtual image V51R and the amount of eyeball correction for the right eye acquired by the adjustment processing explained with reference to FIG. 18.

<Explanation of Touch Recognition Processing>

Figure 21:
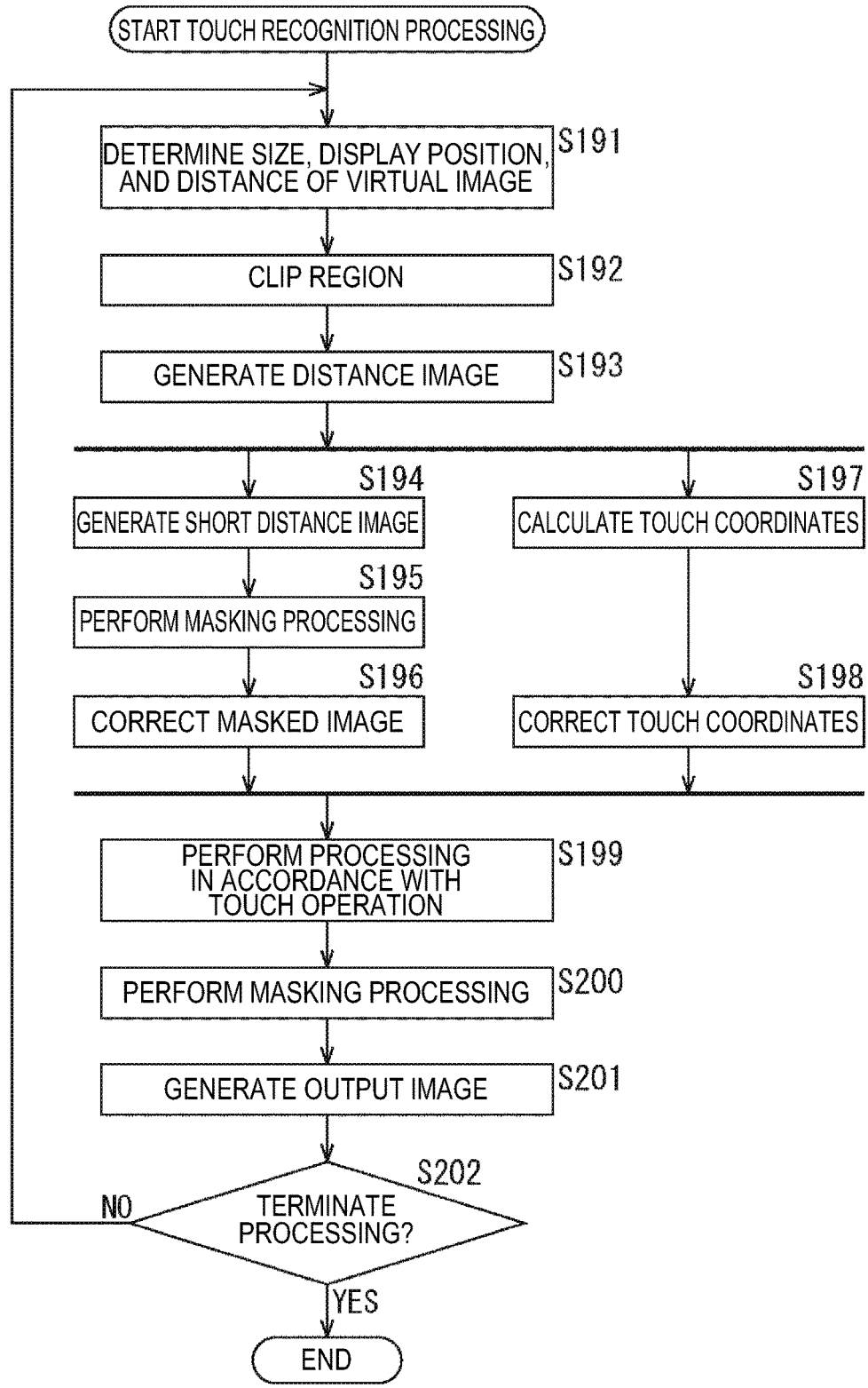
FIG. 21 is a flowchart explaining touch recognition processing.

Next, there will be explained with reference to a flowchart of FIG. 21, the touch recognition processing performed by the display apparatus 231.

At step S191, the determination unit 271 determines a virtual image, and the size, display position and distance of the virtual image.

In other words, the determination unit 271 determines a virtual image and supplies it to the mask processing unit 116. In addition, the determination unit 271 determines the display position, size and distance of the virtual image, supplies the determined display position and size to the image clipping unit 272, and supplies the determined distance to the short distance image separation unit 274.

At step S192, the image clipping unit 272 clips, as a clipped image, a region defined by the display position and size supplied from the determination unit 271 in the input image supplied from imaging unit 241, and supplies the clipped image to the distance calculation unit 273 and the short distance image separation unit 274.

At step S193, the distance calculation unit 273 generates a distance image by performing stereo matching or the like on the basis of the clipped image for the left and right eyes supplied from the image clipping unit 272, and supplies the distance image to the short distance image separation unit 274.

When the process of step S193 is performed, the process from step S194 to step S196, and the process from step S197 to step S198 are subsequently performed in parallel.

At step S194, the short distance image separation unit 274 generates a short distance image by extracting the short distance object from the clipped image supplied from image clipping unit 272 on the basis of the distance supplied from the determination unit 271 and the distance image supplied from the distance calculation unit 273.

When the short distance image is acquired, the process from step S195 to step S202 is subsequently performed and the touch processing is terminated, about which explanation will be omitted because the process is similar to that from step S85 to step S92 of FIG. 11.

As has been described above, the display apparatus 231 corrects the display position and size of the virtual image or the like on the basis of the amount of correction acquired as a result of the adjustment processing, and also detects a touch operation performed by the user and performs processing in accordance with the touch operation.

By causing the virtual image to be displayed at an optional position and recognizing the touch operation for the virtual image based on the distance to the object in each region of the clipped image in this manner, it is possible to improve the operability of the display apparatus 11. In addition, it is possible to further improve the operability by correcting the display gap.

<Exemplary Variation 1 of the Second Embodiment>
<Exemplary Configuration of the Display Apparatus>

Figure 22:
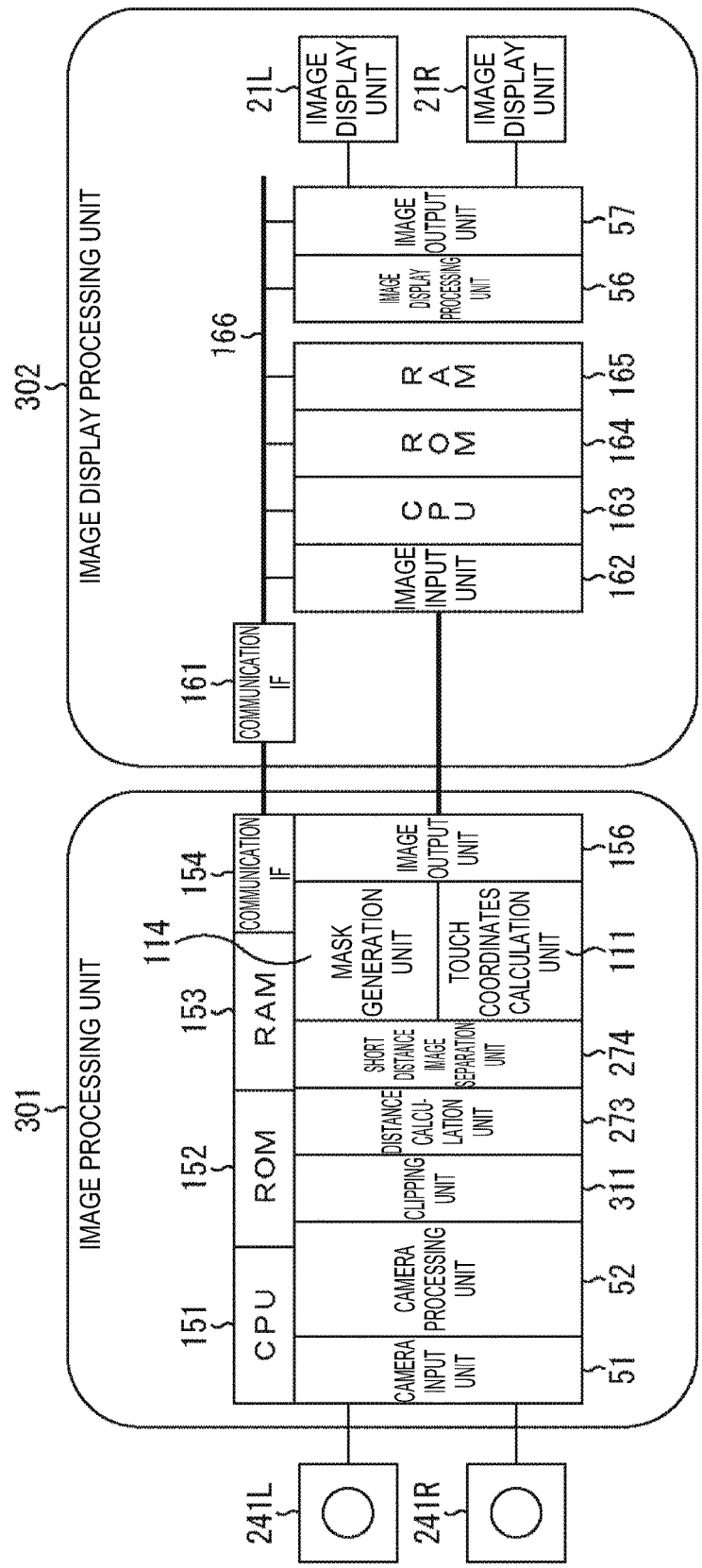
FIG. 22 is a diagram illustrating an exemplary configuration of a display apparatus.

In addition, although an example has been explained above in which the display apparatus 231 has the configuration as illustrated in FIG. 16, the display apparatus 231 may have a configuration as illustrated in FIG. 22. Note that, in FIG. 22, the same sign is attached to a part corresponding to a part in FIG. 12, 16, or 20 and the explanation thereof will be omitted appropriately.

The display device 231 illustrated in FIG. 22 includes the imaging unit 241L, the imaging unit 241R, an image processing unit 301, and an image display processing unit 302.

In the present example, the image processing unit 301 and the image display processing unit 302 are interconnected, and the display apparatus 231 is implemented by the processing unit and a program.

The image processing unit 301 has the CPU 151, the ROM 152, the RAM 153, the communication IF 154, the camera input unit 51, the camera processing unit 52, a clipping unit 311, the distance calculation unit 273, the short distance image separation unit 274, the mask generation unit 114, the touch coordinates calculation unit 111, and the image output unit 156.

Input images are supplied from the two imaging units 241 to the camera input unit 51. In addition, the CPU 151 implements the determination unit 271, or implements the contour extraction unit 85 and components ranging from the adjustment operation determination unit 87 to the scale calculation unit 89 in the adjustment processing, by executing a program stored in the ROM 152. Furthermore, the clipping unit 311 functions as the image clipping unit 272L and the image clipping unit 272R.

In addition, the image display processing unit 302 has the communication IF 161, the image input unit 162, the CPU 163, the ROM 164, the RAM 165, the image display processing unit 56, the image output unit 57, the bus 166, the image display unit 21L, and the image display unit 21R.

In this example, the CPU 163 implements the touch correction unit 112, the touch processing unit 113, the mask correction unit 115, the mask processing unit 116, and the display position correction unit 117 by executing a program stored in the ROM 164. In addition, for example, the CPU 163 implements the correction unit 90 and the display image generation unit 91 by executing a program in execution of the adjustment processing.

<Exemplary Variation 2 of the Second Embodiment>
<Exemplary Configuration of the Display Apparatus>

Figure 23:
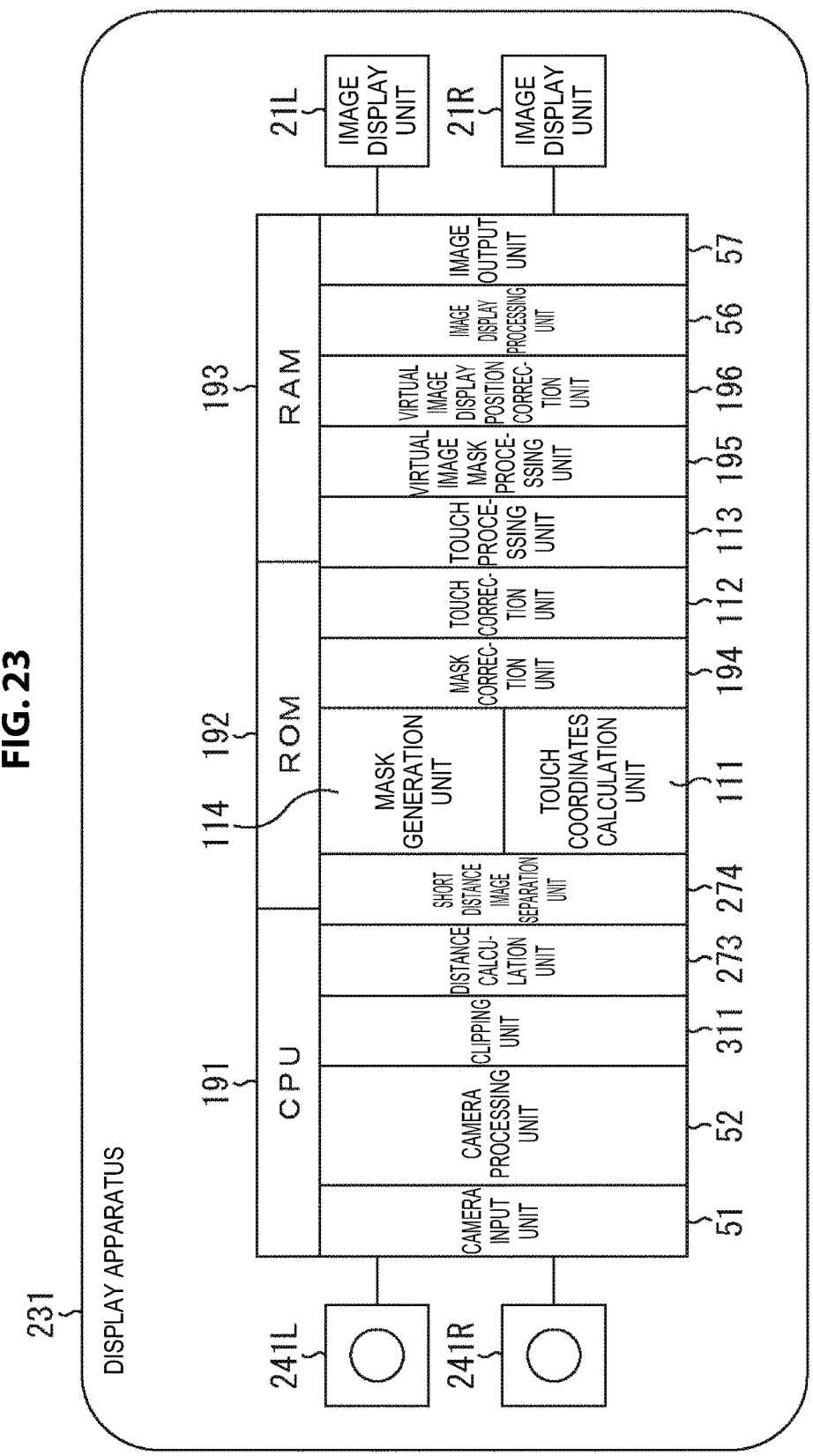
FIG. 23 is a diagram illustrating an exemplary configuration of a display apparatus.

Furthermore, the display apparatus 231 may have a configuration as illustrated in FIG. 23. Note that, in FIG. 23, the same sign is attached to a part corresponding to a part in FIG. 13, 20, or 22 and the explanation thereof will be omitted appropriately.

The display apparatus 231 illustrated in FIG. 23 has the imaging unit 241L and the imaging unit 241R, the CPU 191, the ROM 192, the RAM 193, the camera input unit 51, the camera processing unit 52, the clipping unit 311, the distance calculation unit 273, the short distance image separation unit 274, the mask generation unit 114, the touch coordinates calculation unit 111, the mask correction unit 194, the touch correction unit 112, the touch processing unit 113, the virtual image mask processing unit 195, the virtual image display position correction unit 196, the image display processing unit 56, the image output unit 57, the image display unit 21L, and the image display unit 21R.

In the present example, the CPU 191 implements the contour extraction unit 85 and components ranging from the adjustment operation determination unit 87 to the display image generation unit 91 in execution of the adjustment processing by executing a program stored in the ROM 192. In addition, the RAM 193 functions as the reference image holding unit 86 in execution of the adjustment processing, for example.

In addition, the mask correction unit 194 functions as the mask correction unit 115L and the mask correction unit 115R illustrated in FIG. 20. The virtual image mask processing unit 195 functions as the mask processing unit 116L and the mask processing unit 116R illustrated in FIG. 20, and the virtual image display position correction unit 196 functions as the display position correction unit 117L and the display position correction unit 117R of FIG. 20.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose computer or the like that is capable of executing various functions when various programs are installed.

Figure 24:
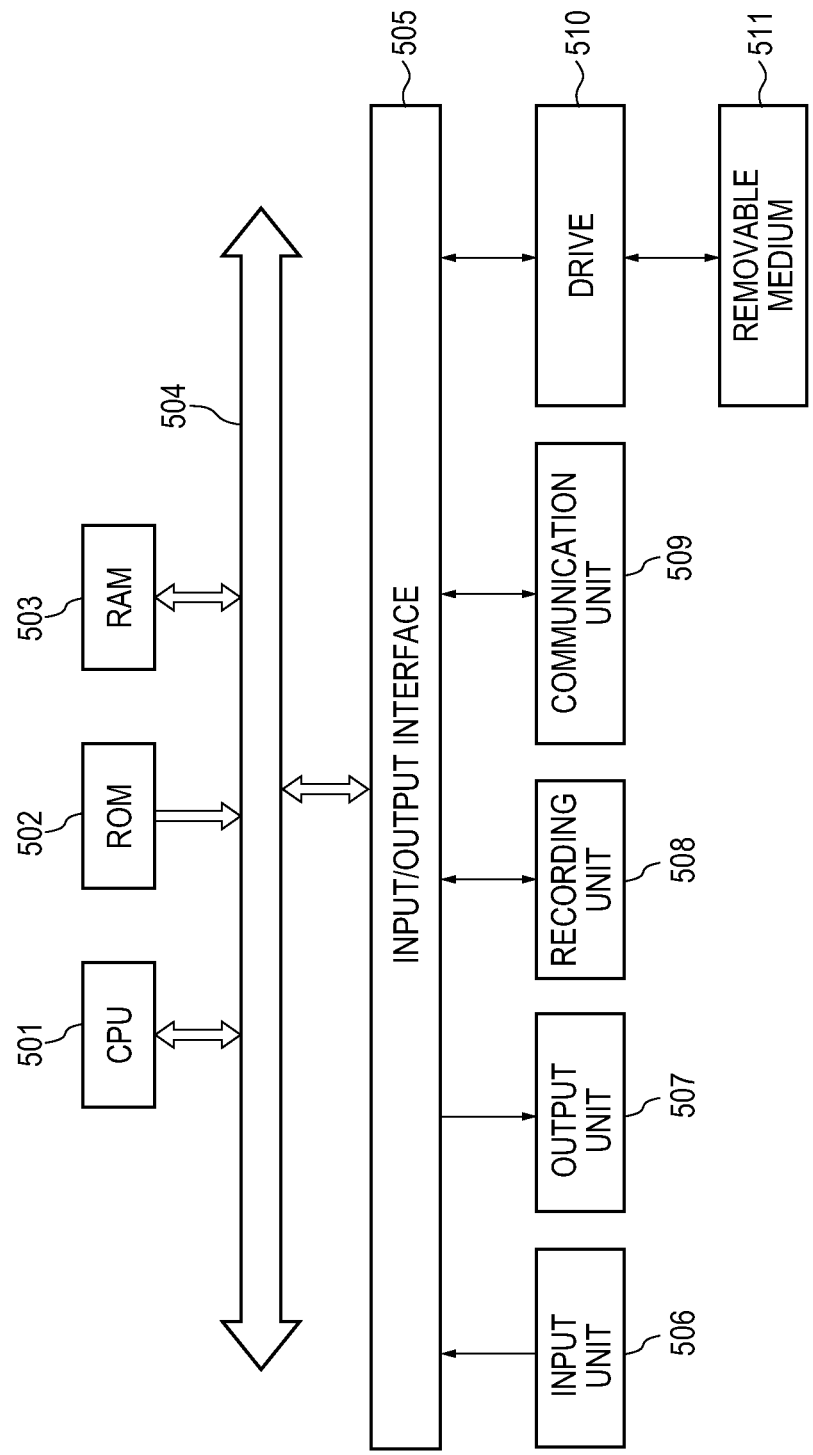
FIG. 24 is a diagram illustrating an exemplary configuration of a computer.

FIG. 24 is a block diagram showing an exemplary configuration of the hardware of a computer that executes the series of processes described earlier according to a program.

In a computer, a CPU 501, a ROM 502, and a RAM 503 are mutually connected by a bus 504.

An input/output interface 505 is also connected to the bus 504. An input unit 506, an output unit 507, a recording unit 508, a communication unit 509, and a drive 510 are connected to the input/output interface 505.

The input unit 506 is configured from a keyboard, a mouse, a microphone, an imaging device or the like. The output unit 507 configured from a display, a speaker or the like. The recording unit 508 is configured from a hard disk, a non-volatile memory or the like. The communication unit 509 is configured from a network interface or the like. The drive 510 drives a removable medium 511 such as a magnetic disk, an optical disk, a magneto-optical disk, a semiconductor memory or the like.

In the computer configured as described above, as one example the CPU 501 loads a program stored in the recording unit 508 via the input/output interface 505 and the bus 504 into the RAM 503 and executes the program to carry out the series of processes described earlier.

As one example, the program executed by the computer (the CPU 501) may be provided by being recorded on the removable medium 511 as a packaged medium or the like. The program can also be provided via a wired or wireless transfer medium, such as a local area network, the Internet, or a digital satellite broadcast.

In the computer, by loading the removable medium 511 into the drive 510, the program can be installed into the recording unit 508 via the input/output interface 505. It is also possible to receive the program from a wired or wireless transfer medium using the communication unit 509 and install the program into the recording unit 508. As another alternative, the program can be installed in advance into the ROM 502 or the recording unit 508.

Note that the program executed by the computer may be a program in which processes are carried out in a time series in the order described in this specification or may be a program in which processes are carried out in parallel or at necessary timing, such as when the processes are called.

An embodiment of the disclosure is not limited to the embodiments described above, and various changes and modifications may be made without departing from the scope of the disclosure.

For example, the present technique can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

The effects described in the above specification are just explanatory or exemplary effects and are not limiting, and other effects may be produced.

Additionally, the present technique may also be configured as below.

(1) An image processing apparatus including:
a generation unit configured to generate, on a basis of an input image captured by an imaging unit disposed in a vicinity of a user's viewpoint and distance information indicating a distance to an object in each region of the input image, an image indicating the object in the input image located closer to the imaging unit than a predetermined distance in real space;
an image display unit configured to display the image, allowing the user to view the object via a display screen; and
an amount-of-correction calculation unit configured to calculate, on a basis of the image at mutually different time points, an amount of correction for correcting a display position or display size of an image to be displayed on the image display unit.

(2) The image processing apparatus according to (1), wherein the amount-of-correction calculation unit calculates the amount of correction for correcting the display position, on a basis of an amount of movement, in the image, of a short distance object, which is the object located closer to the imaging unit than the predetermined distance.

(3) The image processing apparatus according to (2), wherein, in a state where the image as a reference, or the image corrected by the amount of correction and succeeding the image as the reference is being displayed on the image display unit, the amount-of-correction calculation unit calculates the amount of correction, on a basis of an amount of movement of an operation instruction unit between the image captured when the user moves the operation instruction unit so that the operation instruction unit as the short distance object overlaps with the operation instruction unit on the image being displayed, and the image as the reference, or the image succeeding the image as the reference.

(4) The image processing apparatus according to (1), wherein the amount-of-correction calculation unit calculates the amount of correction for correcting the display size, on a basis of a change of size, in the image, of a short distance object, which is the object located closer to the imaging unit than the predetermined distance.

(5) The image processing apparatus according to (4), wherein, in a state where the image as a reference, or the image corrected by the amount of correction and succeeding the image as the reference is being displayed on the image display unit, the amount-of-correction calculation unit calculates the amount of correction, on a basis of a change of size of an operation instruction unit between the image captured when the user moves the operation instruction unit so that the operation instruction unit as the short distance object has a same size as the operation instruction unit on the image being displayed, and the image as the reference.

(6) The image processing apparatus according to (1), wherein the amount-of-correction calculation unit calculates the amount of correction for correcting the display size, on a basis of an amount of movement, in the image, of a specific part of a short distance object, which is the object located closer to the imaging unit than the predetermined distance.

(7) The image processing apparatus according to any one of (1) to (6),
wherein the image display unit further displays a virtual image to be operated by the user, and
wherein the image processing apparatus further includes a correction unit configured to correct the display position or the display size of the virtual image, on a basis of the amount of correction.

(8) The image processing apparatus according to (7), further including:
a mask generation unit configured to generate a masked image indicating an unmasked region, the unmasked region being a region of the object located closer to the imaging unit than a distance of the virtual image in space;
a mask correction unit configured to correct a position or size of the unmasked region in the masked image, on a basis of the amount of correction; and
a mask processing unit configured to remove the unmasked region from the virtual image by performing transparent processing on the virtual image, on the basis of the masked image corrected by the mask correction unit and the amount of correction, wherein the image display unit displays the virtual image subjected to the transparent processing.

(9) The image processing apparatus according to (7) or (8), further including:

an operation correction unit configured to correct, on a basis of the amount of correction, a position on the virtual image operated by the user.

(10) The image processing apparatus according to any one of (1) to (9), wherein the image display unit is provided for each of the user's left and right eyes, and wherein the amount-of-correction calculation unit calculates the amount of correction for each of the user's left and right eyes.

(11) An image processing method including:

generating, on a basis of an input image captured by an imaging unit disposed in a vicinity of a user's viewpoint and distance information indicating a distance to an object in each region of the input image, an image indicating the object in the input image located closer to the imaging unit than a predetermined distance in real space;

displaying the image on an image display unit allowing the user to view the object via a display screen; and calculating, on a basis of the image at mutually different time points, an amount of correction for correcting a display position or display size of an image to be displayed on the image display unit.

(12) A program causing a computer to perform processing including:

generating, on a basis of an input image captured by an imaging unit disposed in a vicinity of a user's viewpoint and distance information indicating a distance to an object in each region of the input image, an image indicating the object in the input image located closer to the imaging unit than a predetermined distance in real space;

displaying the image on an image display unit allowing the user to view the object via a display screen; and calculating, on a basis of the image at mutually different time points, an amount of correction for correcting a display position or display size of an image to be displayed on the image display unit.

REFERENCE SIGNS LIST 11 display apparatus
21L, 21R, 21 image display unit
22 imaging unit
53 CPU
82 image clipping unit
83 clipping unit
84 short distance image separation unit
85 contour extraction unit
87 adjustment operation determination unit
88 XY calculation unit
89 scale calculation unit
90L, 90R, 90 correction unit
111 touch coordinates calculation unit
112 touch correction unit
115L, 115R, 115 mask correction unit
116L, 116R, 116 mask processing unit
117L, 117R, 117 display position correction unit
272L, 272R, 272 image clipping unit
273 distance calculation unit
274 short distance image separation unit

The invention claimed is:

1. An image processing apparatus, comprising:

a generation unit configured to generate, based on an input image captured by an imaging unit disposed in a vicinity of a viewpoint of a user and distance information indicating a distance to an object in each region of the input image, an image indicating the object in the input image located closer to the imaging unit than a threshold distance in real space;

an image display unit configured to display the image, allowing the user to view the object via a display screen; and an amount-of-correction calculation unit configured to calculate, based on the image at mutually different time points, an amount of correction for one of a display position or a display size of the image displayed on the image display unit.

2. The image processing apparatus according to claim 1, wherein the amount-of-correction calculation unit is further configured to calculate the amount of correction for the display position, based on an amount of movement, in the image, of a short distance object, which is the object located closer to the imaging unit than the threshold distance.

3. The image processing apparatus according to claim 2, wherein, in a state where one of the image as a reference or the image corrected by the amount of correction and succeeding the image as the reference is displayed on the image display unit, the amount-of-correction calculation unit is further configured to calculate the amount of correction, based on an amount of movement of an operation instruction unit in the image captured when the user moves the operation instruction unit so that the operation instruction unit as the short distance object overlaps with the operation instruction unit on the image that is displayed, and one of the image as the reference or the image succeeding the image as the reference.

4. The image processing apparatus according to claim 1, wherein the amount-of-correction calculation unit is further configured to calculate the amount of correction for the display size, based on a change of size, in the image, of a short distance object, which is the object located closer to the imaging unit than the threshold distance.

5. The image processing apparatus according to claim 4, wherein, in a state where one of the image as a reference or the image corrected by the amount of correction and succeeding the image as the reference is displayed on the image display unit, the amount-of-correction calculation unit is further configured to calculate the amount of correction, based on a change of size of an operation instruction unit in the image captured when the user moves the operation instruction unit so that the operation instruction unit as the short distance object has a same size as the operation instruction unit on the image that is displayed, and the image as the reference.

6. The image processing apparatus according to claim 1, wherein the amount-of-correction calculation unit is further configured to calculate the amount of correction for the display size, based on an amount of movement, in the image, of a specific part of a short distance object, which is the object located closer to the imaging unit than the threshold distance.

7. The image processing apparatus according to claim 1, wherein the image display unit is further configured to display a user operated virtual image, and wherein the image processing apparatus further includes a correction unit configured to correct one of a display position or a display size of the user operated virtual image, based on the amount of correction.

8. The image processing apparatus according to claim 7, further comprising:
   a mask generation unit configured to generate a masked image indicating an unmasked region,
      wherein the unmasked region is a region of the object located closer to the imaging unit than a distance of the user operated virtual image in space;
   a mask correction unit configured to correct one of a position or a size of the unmasked region in the masked image, based on the amount of correction; and
   a mask processing unit configured to remove the unmasked region from the user operated virtual image by transparent processing on the user operated virtual image, based on the masked image corrected by the mask correction unit and the amount of correction,
   wherein the image display unit is further configured to display the user operated virtual image subjected to the transparent processing.

9. The image processing apparatus according to claim 7, further comprising: an operation correction unit configured to correct, based on the amount of correction, a position on the user operated virtual image.

10. The image processing apparatus according to claim 1,
    wherein the image display unit is provided for each of a user's left eye and a user's right eye, and
    wherein the amount-of-correction calculation unit is further configured to calculate the amount of correction for each of the user's left eye and the user's right eye.

11. An image processing method, comprising:
    generating, based on an input image captured by an imaging unit disposed in a vicinity of a viewpoint of a user and distance information indicating a distance to an object in each region of the input image, an image indicating the object in the input image located closer to the imaging unit than a threshold distance in real space;
    displaying the image on an image display unit allowing the user to view the object via a display screen; and
    calculating, based on the image at mutually different time points, an amount of correction for one of a display position or a display size of the image displayed on the image display unit.

12. A non-transitory computer-readable medium having stored thereon computer-executable instructions that, when executed by a computer, cause the computer to perform operations, the operations comprising:
    generating, based on an input image captured by an imaging unit disposed in a vicinity of a viewpoint of a user and distance information indicating a distance to an object in each region of the input image, an image indicating the object in the input image located closer to the imaging unit than a threshold distance in real space;
    displaying the image on an image display unit allowing the user to view the object via a display screen; and
    calculating, based on the image at mutually different time points, an amount of correction for one of a display position or a display size of the image displayed on the image display unit.

* * * * *